United States Patent
Garza Lagüera Garza

(10) Patent No.: US 9,096,996 B2
(45) Date of Patent: Aug. 4, 2015

(54) WATER SAVER SYSTEM FOR MANAGING AND ELIMINATING LIQUIDS, SEMI-SOLIDS AND SOLIDS, INTEGRATED BY AT LEAST ONE WATER CLOSET AND A WASHBASIN

(75) Inventor: Marcelo Gerardo Garza Lagüera Garza, San Pedro Garza García (MX)

(73) Assignee: Marcelo Gerardo Garza Lagüera Garza, San Pedro Garza García (MX)

(*) Notice: Subject to any disclaimer, the term of this patent is extended or adjusted under 35 U.S.C. 154(b) by 422 days.

(21) Appl. No.: 12/685,098

(22) Filed: Jan. 11, 2010

(65) Prior Publication Data
US 2011/0168281 A1 Jul. 14, 2011

(51) Int. Cl.
*A47K 4/00* (2006.01)
*E03C 1/01* (2006.01)
*E03D 5/00* (2006.01)
*E03D 1/00* (2006.01)

(52) U.S. Cl.
CPC ............... *E03D 5/006* (2013.01); *E03D 1/003* (2013.01); *E03D 2201/40* (2013.01)

(58) Field of Classification Search
USPC ....................................... 4/664, 665, 420, 353
See application file for complete search history.

(56) References Cited

U.S. PATENT DOCUMENTS

| | | | |
|---|---|---|---|
| 1,289,151 A | 12/1918 | Gavin | |
| 1,337,663 A | 4/1920 | Lawrence et al. | |
| 1,447,529 A | 3/1923 | Bowers | |
| 3,015,827 A * | 1/1962 | Iwata | 4/324 |
| 3,696,448 A | 10/1972 | Carfora | |
| 4,142,256 A * | 3/1979 | Campbell | 4/664 |
| 4,358,864 A | 11/1982 | Medrano | |
| 4,646,780 A * | 3/1987 | Spooner | 137/426 |
| 5,228,152 A * | 7/1993 | Fraley | 4/664 |
| 5,404,597 A | 4/1995 | Hennessy | |
| 5,452,956 A | 9/1995 | Gilliam | |
| 5,514,316 A | 5/1996 | Kosugi et al. | |
| 5,522,096 A * | 6/1996 | Brown | 4/665 |
| 5,651,148 A | 7/1997 | Bayot | |
| 5,711,039 A * | 1/1998 | Mizrahi | 4/344 |
| 5,926,863 A | 7/1999 | Arita et al. | |
| 6,076,199 A * | 6/2000 | Na | 4/420.4 |
| 6,237,164 B1 * | 5/2001 | LaFontaine et al. | 4/353 |

(Continued)

FOREIGN PATENT DOCUMENTS

MX 181614 8/1994

*Primary Examiner* — Janie Christiansen
(74) *Attorney, Agent, or Firm* — Hoffmann & Baron, LLP

(57) ABSTRACT

A water-saving system for the management and disposal of liquid, semi-solid and solid wastes is described that comprises an open-rim toilet bowl for allowing the flow of greywater containing food residues, small pieces of soap, soapy water, toothpaste residues, shaving residues, hair and the like, without allowing the formation of obstructions throughout the length of the open rim; an anti-sedimentation tank placed above and connected to the toilet bowl, said anti-sedimentation tank being capable of receiving and storing greywater that will be reused to flush the toilet to clean the toilet bowl and flush the wastes contained therein; a washbasin-shaped tank lid located above and closing the upper part of the anti-sedimentation tank; and mixer valve installed in the washbasin-shaped lid and connected to cold and hot water supplies, where the mixer valve includes a third water supply intake which is also connected to a water outlet of the intake valve of the anti-sedimentation tank by means of a flexible hose.

7 Claims, 17 Drawing Sheets

(56) References Cited

U.S. PATENT DOCUMENTS

| | | | |
|---|---|---|---|
| 6,425,148 B1 * | 7/2002 | Chen | 4/665 |
| 6,428,643 B1 | 8/2002 | Bergquist et al. | |
| 6,715,162 B2 | 4/2004 | Han et al. | |
| 2005/0166308 A1 * | 8/2005 | Miwa et al. | 4/420 |
| 2008/0276361 A1 * | 11/2008 | Mueller et al. | 4/420 |
| 2009/0113620 A1 * | 5/2009 | Fryan | 4/665 |

\* cited by examiner

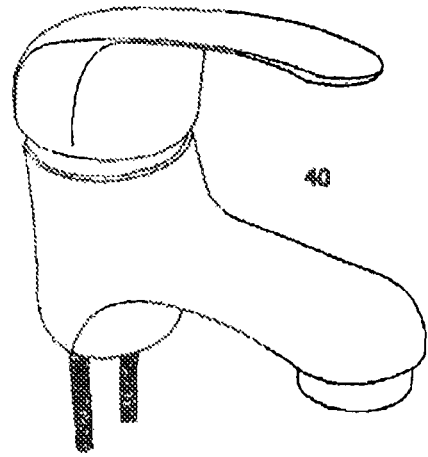
FIGURE 7 - PRIOR ART -
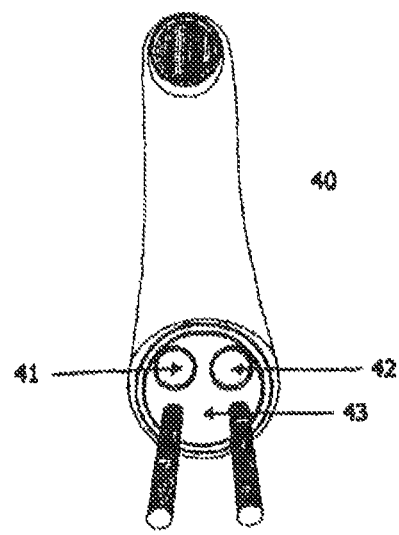
FIGURE 8 - PRIOR ART -
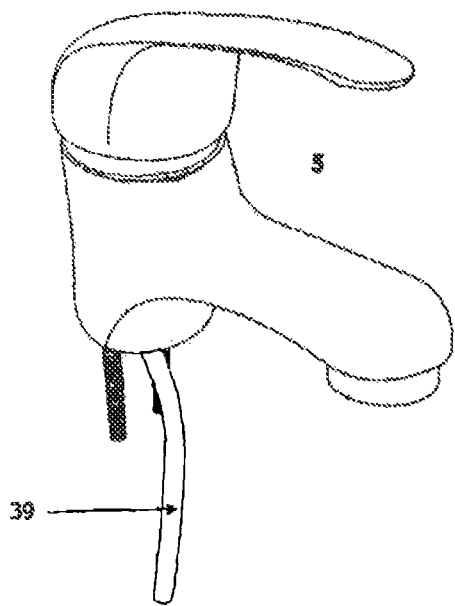
FIGURE 9
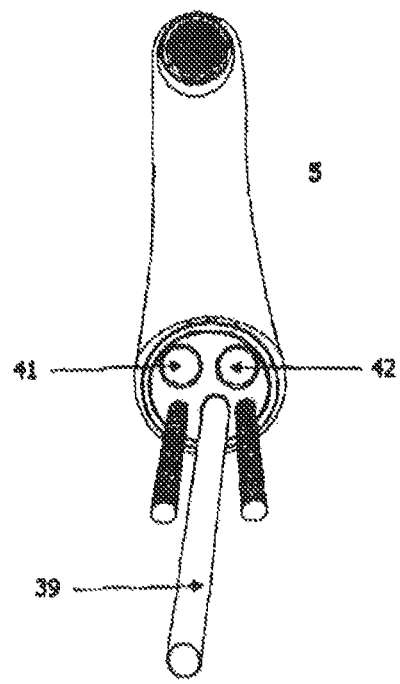
FIGURE 10

WATER SAVER SYSTEM FOR MANAGING AND ELIMINATING LIQUIDS, SEMI-SOLIDS AND SOLIDS, INTEGRATED BY AT LEAST ONE WATER CLOSET AND A WASHBASIN

TECHNICAL FIELD OF THE INVENTION

The present invention relates to the field for optimizing water consumption and reusing greywater; and in particular, the present invention relates to a saving system for the adequate and efficient management and disposal of liquid, semi-solid and/or solid wastes that are disposed of through a toilet that works by gravity and a washbasin in fluid communication with said toilet.

BACKGROUND OF THE INVENTION

The concern for achieving a more rational use of water is a matter of increasing relevance worldwide. A toilet or lavatory that works by gravity (that is, not assisted by pressure) is a device with which more water is consumed in homes, representing up to 40% of the domestic consumption of this resource. In order to promote a reduction in water consumption, international regulations have established limits to the allowable volume of water to be used for each discharge to empty a toilet. Thus, in 1994, NOM-CNA-009 was issued, which establishes that toilets manufactured and/or marketed in our country must discharge a volume less than or equal to 6 L; this rule is aligned with current international standards.

But awareness regarding the care of the environment and natural resources continues to evolve, and the international standards on the matter tend to become increasingly stricter in order to respond to the need for optimizing the rational use and consumption of water. Bathroom fixture manufacturers have focused on developing or improving two technologies in order to perfect toilet operation.

The first technology is related to the hydraulic performance of the toilet bowl in order to maximize the siphoning effect caused by the vacuum generated in the toilet trap as the water level in the bowl increases when it receives water from the tank when the toilet is flushed.

Examples of efforts in this technology are described in Hennessy's U.S. Pat. No. 5,404,497 entitled "Vacuum-assisted toilet trap," which discloses a vacuum-assisted toilet in which vacuum is applied between a low trap and a high trap at the outlet of a toilet bowl, where the low trap is built to more reliably ensure that an air conduit over a water repository of the lower trap will close at the beginning of the discharge and will remain open between discharges.

Bayot's U.S. Pat. No. 5,651,148 entitled "Toilet with vortex discharge" describes a toilet bowl and rim capable of generating superior vortex action. A restrictor is strategically placed on one side of the rim to branch the direction of the streams of water and make them converge at one side of the rim. The relocation of the point of contact, conventionally placed in the middle, and its placement at a strategically located side of the rim increases the speed and force of the stream of water. Controlling the volume, flow and directional orientation of the water flow within and through the rim's cavity and through the rim's discharge orifices produces superior vortex action.

Arita et al.'s U.S. Pat. No. 5,926,863 entitled "Low discharge toilet" describes a toilet bowl that includes an opening to supply water for washing the toilet bowl in one part of the toilet bowl wall; a water discharge channel in the form of a substantially inverted "U"-type trap formed next to the base of the toilet bowl and having a discharge opening in the lower part; a portion that distributes the wash water placed substantially below the tank's discharge opening and used to receive and distribute the tank's clean water; a ring for directing the trajectory of the water formed in the periphery of the highest part of the toilet bowl, a part of said ring having a plurality of water injection perforations for washing in communication with the water trajectory of said ring; a first water channel that communicates the part that distributes the wash water and the opening that distributes the wash water; and a second water channel that communicates the part that distributes the wash water and the water trajectory of said ring.

Han et al.'s U.S. Pat. No. 6,715,162 B2 entitled "Toilet assembly" discloses a toilet that includes a toilet bowl assembly that consists of a toilet bowl and a trap that extends from the bottom of the toilet bowl to the drain outlet. The toilet bowl has an annular channel, provided along the perimeter of the upper part of said toilet bowl. In this toilet, the stream of water flows through the annular channel in a trajectory that is asymmetrical and unidirectional throughout its entire perimeter. The annular channel includes a plurality of openings set uniformly throughout the perimeter of said annular channel. When the water passes through the plurality of openings, it wets the entire perimeter of the toilet bowl. The annular channel also includes a pair of water discharge grooves that lead the water directly to the toilet bowl in two powerful streams. The discharge valve that allows the water to pass from the tank to the toilet bowl has a radial port inlet that increases the water flow's outlet energy.

A disadvantage of the toilets described in the above-mentioned patents resides in the fact that they were developed to comply with the criteria expressed in current international regulations and ensure good operation in toilets with a 6-L discharge. However, this technology has the drawback of not being useful or efficient when one wishes to reduce the toilet discharge volume from 6 L to, for example, 4 L, without having to drastically and integrally modify its hydraulic design or its principles since, in order to achieve a reduction in water consumption of this magnitude, it is necessary to redesign all of the components of the toilet, as well as the way they interrelate to each other.

The second technology focuses on the development of modified toilets in which the water previously used in a washbasin, shower, washer, etc., is stored in the tank in order to reuse it for cleaning the toilet bowl and the wastes it contains.

Examples of the advances in this technology are described, for example, in Carfora's U.S. Pat. No. 3,696,448 entitled "Combined toilet and washbasin," which discloses a washbasin to be mounted on the discharge tank of a toilet used in a bathroom or other room with very limited space. The washbasin replaces the lid of the toilet tank and is completely separate from a water valve connected to the cold and hot water lines and mounted on the wall, in order to allow the washbasin to be lifted when the toilet tank requires repairs.

Medrano's U.S. Pat. No. 4,358,864 entitled "Conservation system combining washbasin and toilet" describes a water conservation system that combines a washbasin and a toilet, which has at least one washbasin and one toilet that in turn includes a water tank. The water tank has a clean water chamber and a greywater chamber. A first outlet connects the greywater chamber to the toilet bowl and a flap valve ("frog") closes this outlet. A second outlet connects the clean water chamber to the greywater chamber, and a flotation valve closes this outlet. A pipe is used to connect the washbasin's drain to the tank's greywater chamber. Another pipe connects a source of clean water to the clean water chamber. A hand lever on the outside of the tank operates a lever arm inside of the tank such that when it is lifted, it activates a mechanism that opens the flotation valve allowing the clean water to enter the greywater chamber. The structure also acts on the greywater chamber when the lever arm lifts and this structure opens the flap valve to launch the water from the greywater chamber to clean the toilet bowl.

Gilliam's U.S. Pat. No. 5,452,956 entitled "Greywater recirculation system with odor prevention" describes a mechanism in which a small amount of greywater is collected in a storage tank to be used in cleaning toilets. During its use, the greywater is agitated to discharge small solid particles with the water supplied to the toilet. Agitating the water in the storage tank also prevents the water from stratifying and prevents the disinfectant from stratifying in the greywater, which can stagnate in the absence of disinfectant and agitation. The action of agitating the greywater also makes the system clean itself.

Pacchiano's Mexican Patent No. 181,614 entitled "Water-saving system" describes a water-saving system that consists of a toilet whose water storage tank is equipped with a device for supplying water, part of which projects outside of the tank, and a tank lid with a special design whose configuration offers a washbasin area in communication with the fluids inside the tank.

This type of toilet (which combines and/or associates a toilet with other devices, such as, for example, a washbasin) provides for decreased water consumption, since at least part of the water used in the washbasin or other sources would be reused. However, this type of toilet has two serious problems. The first problem consist of the fact that the water used in a washbasin or other sources contains semi-solid and/or solid wastes (such as food residues, small pieces of soap, soapy water, toothpaste residues, shaving residues, hairs, etc.) that are stored in the toilet tank together with the water which will then be reused upon flushing the toilet to clean the toilet bowl and flush the wastes therein, causing sedimentations and/or encrustations inside of the tank. This problem originates because tanks are usually cube-shaped, with a flat bottom, leaving a reservoir caused by the difference in levels between the bottom of the tank and the lip of the discharge valve. In addition, the same vitreous coating used for the external finish of the bathroom appliances is not applied to the internal surface of conventional toilet tanks, which has the drawback of the inside of the tank not being sanitary and, due to the porosity of its internal surface, it also provides much greater adherence for the impurities contained in the water.

When it is only a matter of rust in the tubes or the small impurities that water frequently entrains through the tube to the tank, sedimentation may not be serious. However, when the water with which the tank is replenished has previously been used in the washbasin (as occurs in some of the water-saving systems described), said water contains both inorganic and organic semi-solid and/or solid wastes, and the formation of sediments can cause a problem that can be as severe and risky as bad odors and foci of contamination or infection resulting from the decomposition of the organic material.

Another drawback of this type of water-saving system that combines a toilet with a washbasin resides basically in the fact that in order to have a flow of water in the washbasin and for said flow to be stored in turn in the toilet tank for reuse, it is necessary to activate the toilet lever even when it does not need to be cleaned. In other words, if a user wishes to use the washbasin to wash his hands or mouth, the user must necessarily first activate the toilet's discharge lever to initiate the flow of water in the washbasin, which represents an unnecessary waste of water.

The other problem presented by this type of modified toilet is that the semi-solid and/or solid wastes entrained from the tank obstruct the orifices in the rim of closed-rim toilet bowl, through which the water flows to wash the walls of the toilet bowl's bowl, since these orifices are relatively narrow (between 0.16 cm and 0.0793 cm in diameter ($\frac{1}{16}$ and $\frac{1}{32}$ inch)), causing the toilet to be incapable of managing and/or disposing of the liquid, solid and/or semi-solid wastes that are stored in the tank, which come from a washbasin with which said tank is interconnected.

Taking into account the disadvantages of the prior art, one objective of the present invention is to provide a water-saving system consisting of at least one toilet and one washbasin or other source which will efficiently manage and dispose of the liquid, semi-solid and/or solid wastes that are stored in the tank of said toilet, together with the water previously used in said washbasin or other source.

Another objective of the present invention is to provide an ecological anti-sedimentation tank for toilets that will allow storing the water previously used in washbasins or other sources and will prevent the semi-solid and/or solid wastes that reach said tank from depositing in the bottom of said tank, whether these residues are inorganic or organic.

Another objective of the present invention is to provide a water-saving system consisting of at least one toilet and one washbasin that will efficiently manage and dispose of the liquid, semi-solid and/or solid wastes that are stored in the tank of said toilet and that will be capable of achieving the complete cleaning of the wastes contained in the bowl of said toilet, with a discharge of only 4 L of water.

Yet another objective of the present invention is to provide a water-saving system consisting of at least one toilet and one washbasin that also includes a modified washbasin mixer so the washbasin can be used without having to discharge the toilet tank.

Another objective of the present invention is to provide an ecological anti-sedimentation tank for toilets that will allow storing water previously used in washbasins or from other sources and that will prevent the semi-solid and/or solid wastes that reach said tank from being encrusted on the bottom and/or the walls of said tank, whether these residues are inorganic or organic.

Yet another objective of the present invention is to provide an ecological anti-sedimentation tank for toilets that will allow an adequate and efficient management and disposal of the semi-solid and/or solid wastes that are entrained by the water previously used in the washbasin or from other sources.

Still another objective of the present invention is to provide a water-saving system consisting of at least one toilet and one washbasin that will efficiently manage and dispose of the liquid, semi-solid and/or solid wastes that are stored in the tank of said toilet, consisting of a toilet bowl capable of evacuating the liquid, solid and semi-solid wastes it receives from the tank to which it is joined without the wastes causing obstructions in the rim.

BRIEF DESCRIPTION OF THE INVENTION

In a first aspect, the present invention relates to a water-saving system to manage and dispose of liquid, semi-solid and solid wastes, characterized in that it comprises an open-rim toilet bowl for allowing a flow of greywater containing food residues, small pieces of soap, soapy water, toothpaste residues, shaving residues, hair and the like, without allowing obstructions to form along the open rim; an anti-sedimentation tank placed above and connected to the toilet bowl, said anti-sedimentation tank being capable of receiving and storing greywater, which will be reused when the toilet is flushed to clean the toilet bowl and flush the wastes contained therein;

a washbasin-shaped tank lid placed above and closing the upper part of the anti-sedimentation tank; and a mixer valve installed in the washbasin-shaped lid that is connected to cold and hot water supplies, where the mixer valve includes a third water supply intake that is also connected to a water outlet of the intake valve of the anti-sedimentation tank by means of a flexible hose.

In an alternative embodiment, the water-saving system also includes a conventional lid for closing the anti-sedimentation tank, where the washbasin-shaped lid is installed in a remote position in relation to the anti-sedimentation tank. The system also includes a channel for housing a conduction tube for transporting the greywater from the washbasin-shaped lid to the anti-sedimentation tank, as well as for guiding the flexible hose from the third water supply intake of the mixer valve to the water outlet of the intake valve of the anti-sedimentation tank.

In another embodiment, the water-saving system includes a conventional lid for closing the anti-sedimentation tank and a conventional washbasin located in a remote position in relation to the anti-sedimentation tank.

In a second aspect, the present invention relates to a toilet bowl that is useful in a system for the management and disposal of liquid, solid and semi-solid wastes, characterized in that it comprises a bowl, a radially open rim throughout its entire length that consists of a skirt and a vortex, the rim including a rear section, two side sections, left and right, and a front section, where each section includes a different opening in each section to avoid forming obstructions throughout its length and where each opening is defined by the distance between the skirt and the vortex; and a trap.

In a third aspect, the present invention relates to a modified mixer valve that is useful in a system for the management and disposal of liquid, solid and semi-sold wastes. The valve includes a valve base, a valve body, a water-outlet orifice located at the end of the valve body, a cold water-inlet orifice located at the base of the valve, and an internal conduit where the cold and hot water inlet orifices converge to allow the water to flow, characterized in that the mixer valve has a third water-supply intake at the base and in that it communicates with the internal conduit.

BRIEF DESCRIPTION OF THE FIGURES

The aspects that are considered characteristic of the present invention will be established in detail in the attached claims. However, the invention itself, both because of its organization and its operating method, together with other of its objectives and advantages, will be better understood in the following description when it is read in relation to the attached drawings, in which similar reference numbers identify identical items, wherein:

FIG. 7 is a perspective view that shows an example of a washbasin mixer valve of the state of the art.

FIG. 8 is a lower plan view of the washbasin mixer valve shown in FIG. 7.

FIG. 9 is a perspective view of a modified mixer valve according to the present invention.

FIG. 10 is a lower plan view of the modified mixer valve shown in FIG. 9.

DETAILED EXPLANATION OF THE INVENTION

Figure 1:
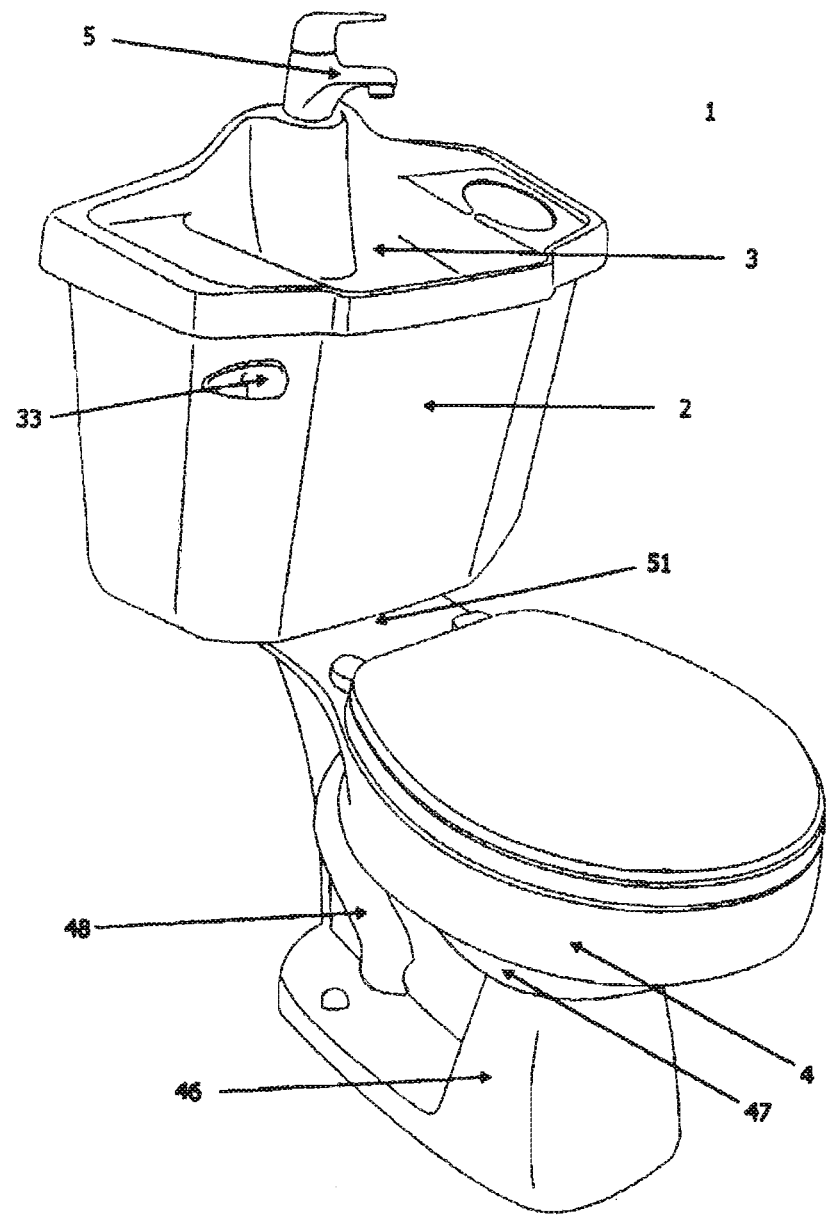
FIG. 1 is a perspective view of a first embodiment of the water-saving system of the present invention.

FIG. 1 shows a first embodiment of the water-saving system that efficiently manages and disposes of liquid, semi-solid and solid wastes 1 of the present invention. As shown, water-saving system 1 includes an open-rim toilet bowl 4 that allows the free flow of greywater containing food residues, small pieces of soap, soapy water, toothpaste residues, shaving residues, hair, etc., without allowing obstructions to form; an anti-sedimentation tank 2 placed above and connected to toilet bowl 4, said anti-sedimentation tank being capable of receiving and storing the greywater that contains food residues, small pieces of soap, soapy water, toothpaste residues, shaving residues, hair, etc., which will be reused to flush the toilet to clean the toilet bowl and flush the wastes contained therein; a modified tank lid of adequate shape and size to function as a washbasin 3, which is located above and closes the upper part of anti-sedimentation tank 2; and a modified mixer valve 5 installed in the washbasin-shaped lid, connected to a cold and hot water supply, as well as to water outlet 36 of intake valve 37 by means of a flexible hose 38 (see FIG. 6).

Figure 1A:
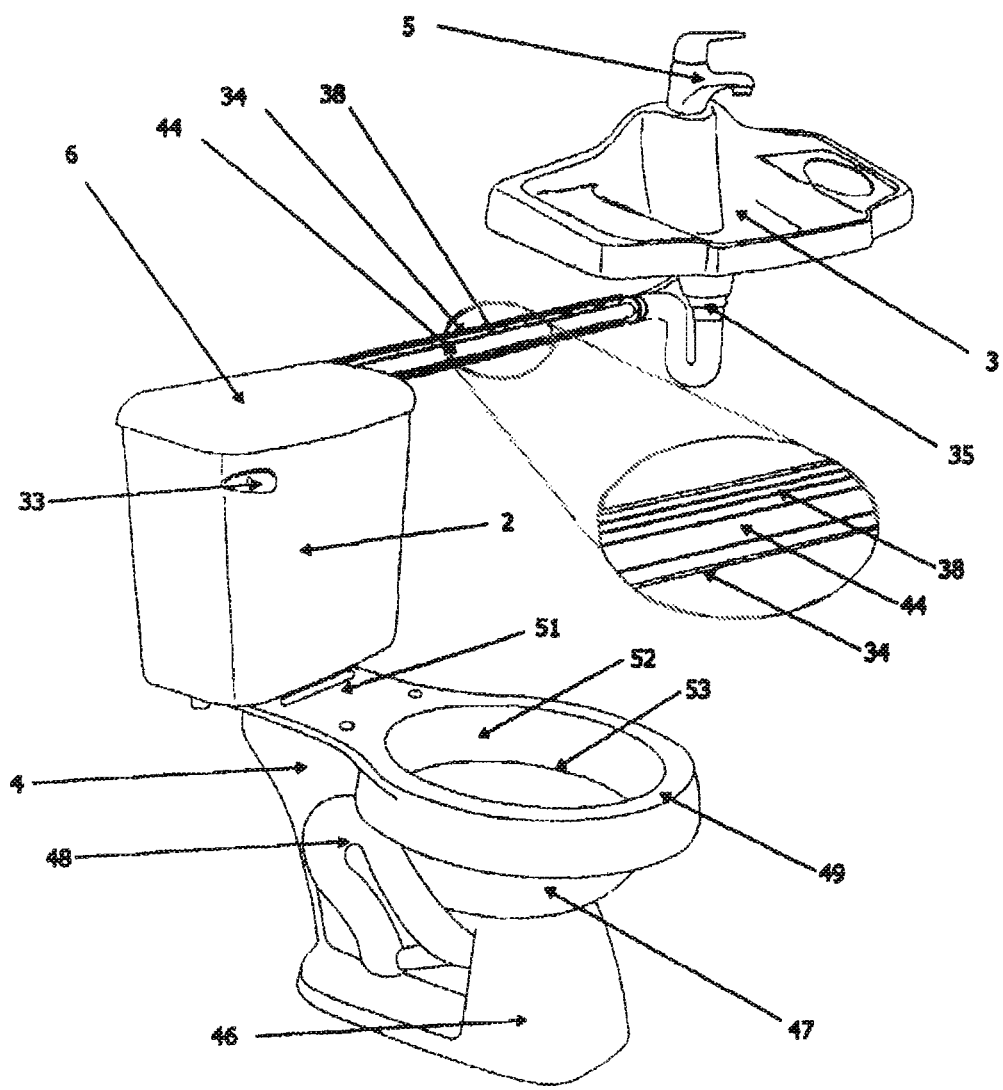
FIG. 1A is a perspective view of a second embodiment of the water-saving system of the present invention that shows the washbasin-shaped lid in a remote position in relation to the toilet tank.

The alternative embodiment of the present invention shown in FIG. 1A includes an open-rim toilet bowl 4 that allows the flow of greywater containing food residues, small pieces of soap, soapy water, toothpaste residues, shaving residues, hair, etc., without allowing obstructions to form; an anti-sedimentation tank 2 located above and connected to toilet bowl 4, said anti-sedimentation tank 2 being capable of receiving and storing the greywater that contains food residues, small pieces of soap, soapy water, toothpaste residues, shaving residues, hair, etc., which will be reused upon flushing the toilet to clean the toilet bowl and flush the wastes contained therein; a conventional tank lid 6; a modified washbasin-shaped tank lid 3, placed in a remote position in relation to anti-sedimentation tank 2; and a modified mixer valve 5 installed in washbasin 3, connected on the one hand to a cold water supply and to a hot water supply, and on the other hand to water outlet 36 of intake valve 37 by means of a flexible hose 38 connected to a third supply intake 39 (see FIG. 6), where the water-saving system also includes a channel 34 that houses a PVC tube 44 for transporting greywater from washbasin drain outlet 35 to anti-sedimentation tank 2, and for guiding flexible hose 38 inside of it.

Figure 1B:
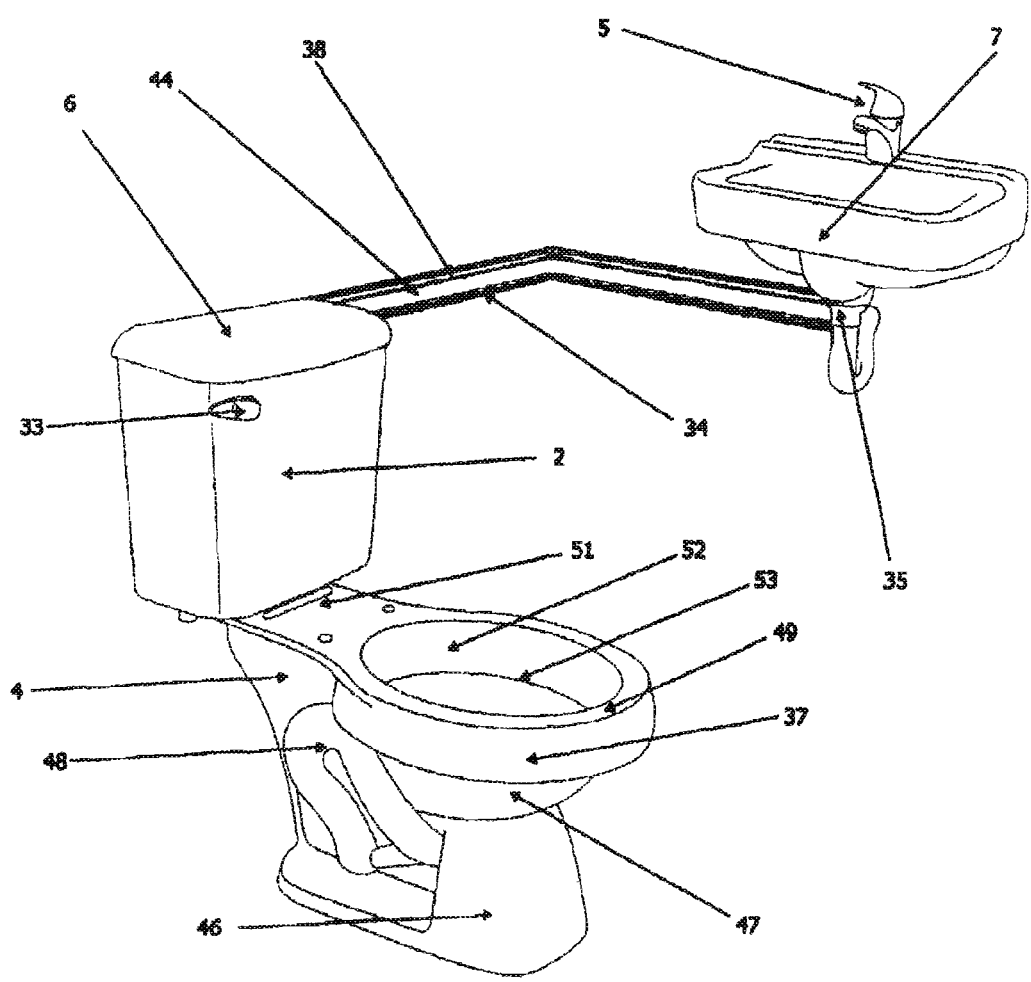
FIG. 1B is a perspective view of a third embodiment of the water-saving system of the present invention that shows a conventional washbasin connected to the anti-sedimentation tank of the present invention.

The other alternative embodiment of the present invention shown in FIG. 1B includes an open-rim toilet bowl 4 that allows the flow of greywater that contains food residues, small pieces of soap, soapy water, toothpaste residues, shaving residues, hair, etc., without allowing obstructions to form; an anti-sedimentation tank 2 located above and connected to toilet bowl 4, said anti-sedimentation tank being capable of receiving and storing the greywater that contains food residues, small pieces of soap, soapy water, toothpaste residues, shaving residues, hair, etc., which will be reused upon flushing the toilet to clean the toilet bowl and flush the wastes contained therein; a conventional tank lid 6; a conventional washbasin 7; and a modified mixer valve 5 installed in washbasin 7 and connected on the one hand to a cold water supply and to a hot water supply, and on the other hand to water outlet 36 of intake valve 37 by means of a flexible hose 38 joined to third supply intake 39 (see FIG. 6), where the water-saving system also includes a channel 34 that houses a PVC tube 44 for transporting the greywater from the outlet of washbasin drain 35 to anti-sedimentation tank 2, in addition to guiding flexible hose 38 inside of it.

Anti-Sedimentation Tank

Figure 2:
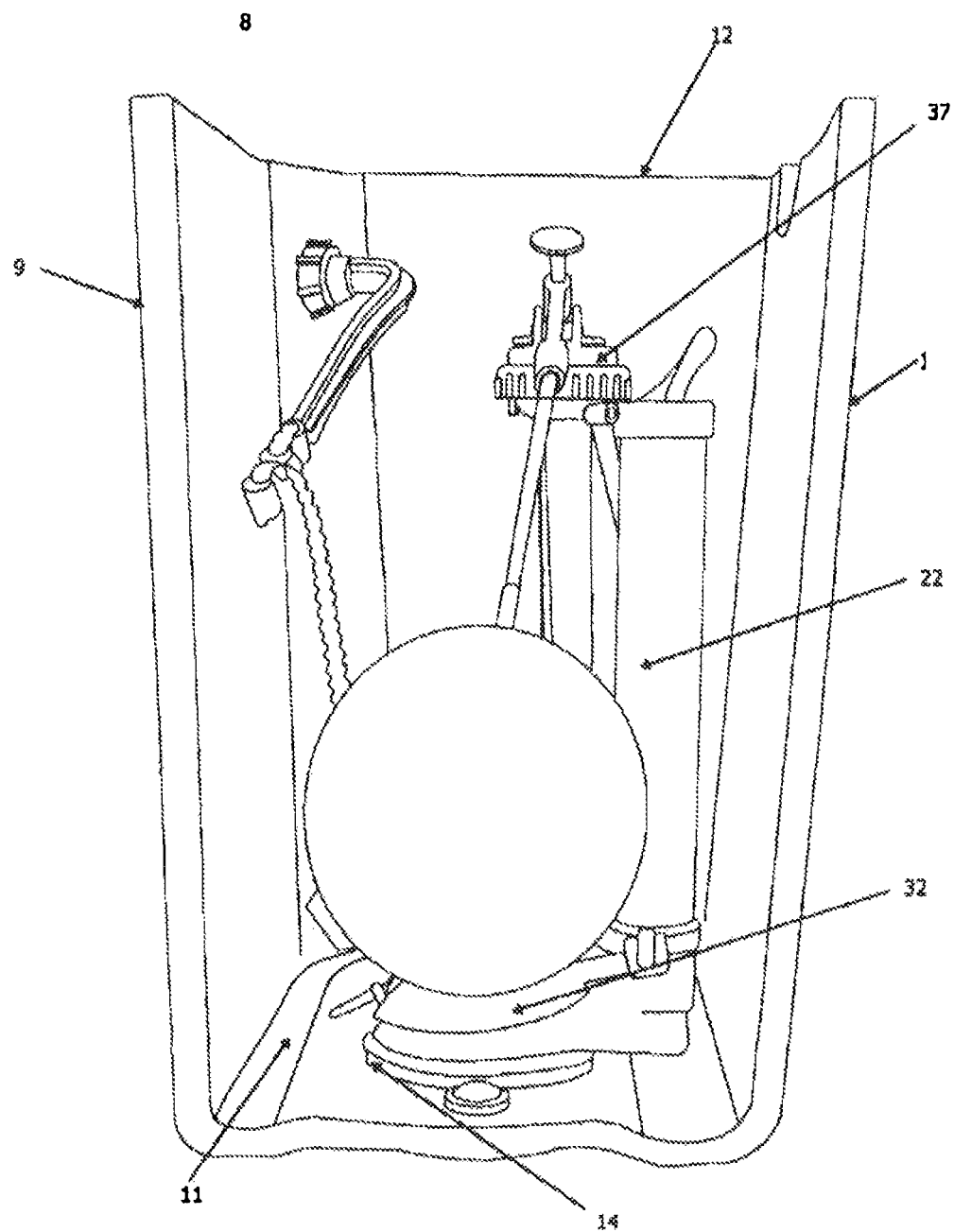
FIG. 2 is a side view that shows a flat-bottomed toilet tank of the prior art.

Prior-art toilet tank 8, as shown in FIG. 2, generally comprises a main body that includes a front wall 9, a rear wall 10, a flat bottom 11 and a pair of side walls, left wall 12 and right wall 13, which form an interior volume for receiving and containing water that will be used to clean the toilet bowl. In particular, flat bottom 11 of the tank has a series of orifices (not shown) arranged in order to place and attach the mechanisms commonly used in a conventional toilet tank, such as an orifice for the discharge valve, an orifice for the intake valve and a couple of orifices for securing the tank to the toilet bowl.

Figure 3:
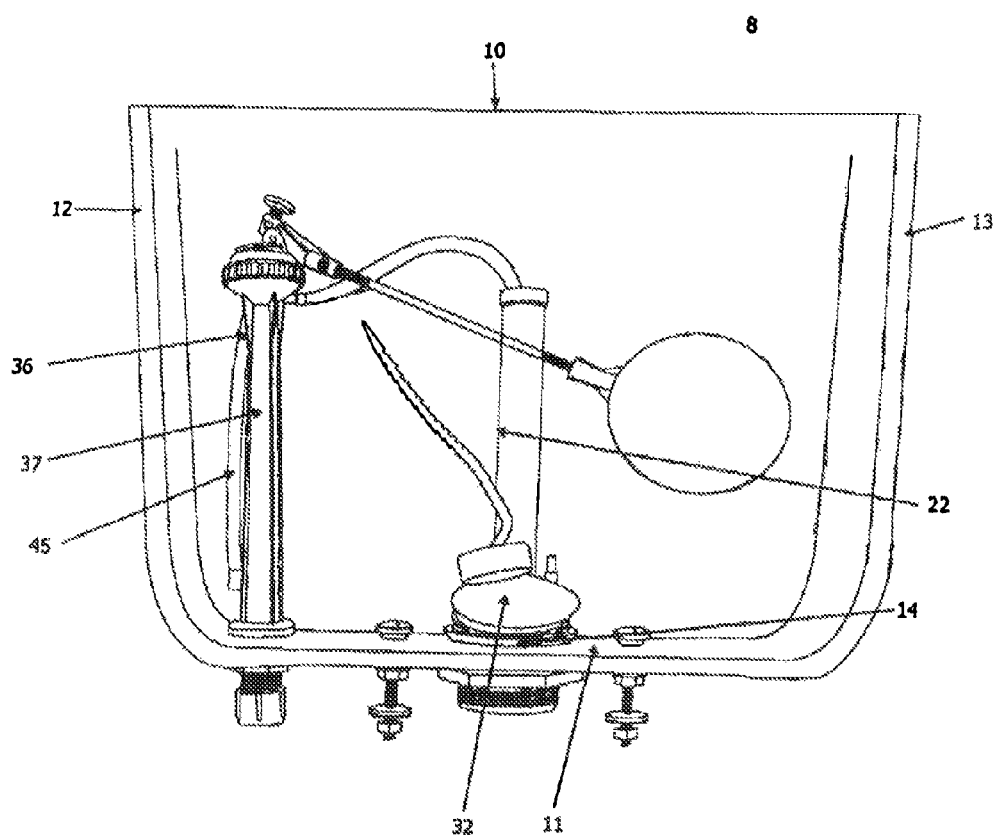
FIG. 3 is a front view of the toilet tank in FIG. 1 that shows where sedimentation takes place.

As can be clearly seen in FIGS. 2 and 3, flat bottom 11 of toilet tank 8 and the lip of discharge valve 14 have different levels, forming a reservoir that causes the solid particles usually entrained by the water in the pipe to be deposited in flat bottom 11, forming sediments. In particular, this type of flat-bottomed toilet tank will tend to form sedimentation in a marked manner when it receives water previously used in a washbasin, a clothes washer, a pump that sends water from the shower area, etc., where said water, in addition to the solid particles it normally contains, will entrain both inorganic and organic semi-solid and/or solid wastes (for example, food residues, fine sand, soapy water, small pieces of soap, toothpaste residues, shaving residues, hair, etc.).

Figure 4:
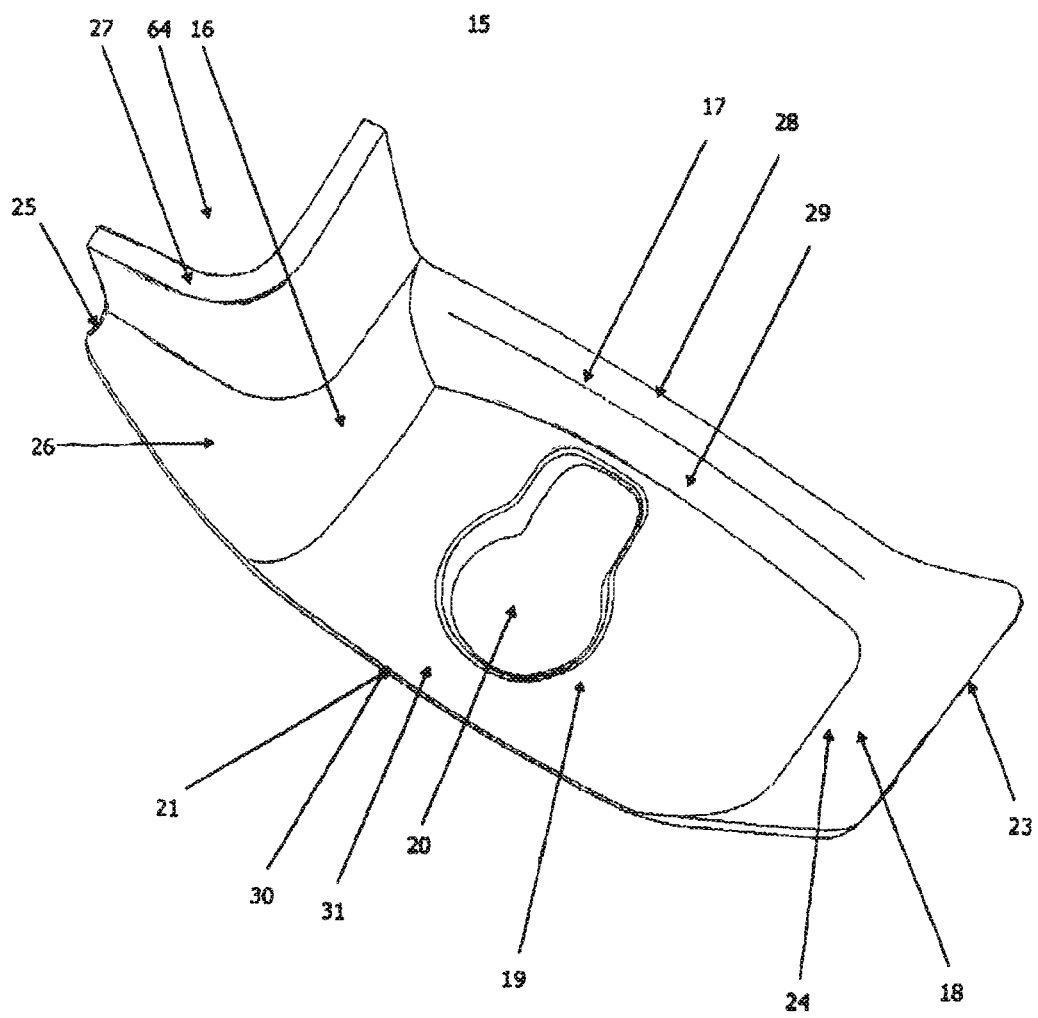
FIG. 4 is an upper perspective view that shows an anti-sedimentation member of the present invention.

In reference now to FIG. 4, a preferred configuration of an anti-sedimentation member 15 is shown, which is incorporated into the anti-sedimentation tank of the present invention. Anti-sedimentation member 15 comprises a left side wall 16, a rear wall 17, a right side wall 18, a slightly concave bottom 19, an orifice 20 located centrally in slightly concave bottom 19, and a front wall 21. Side walls 16, 18 and rear wall 17 have an internal surface and an external surface. Side walls 16, 18 of the anti-sedimentation member project in a descending manner at a given degree of inclination toward bottom 19, which is the lowest point of anti-sedimentation member 15, which finishes in an orifice 20, which is located above and adjacent to the orifice of tank bottom 11, where discharge valve 22 is installed (not illustrated in FIG. 4). Side walls 16, 18, rear wall 17 and front wall 21 of anti-sedimentation member 15 that project in an inclined manner significantly increase the entrainment force of the water that entrains any solid and/or semi-solid material that is contact with its internal surfaces to orifice 20 of the anti-sedimentation member, which is in fluid communication with discharge valve 22, consequently preventing the adhesion and formation of sediments on its surfaces.

Figure 5:
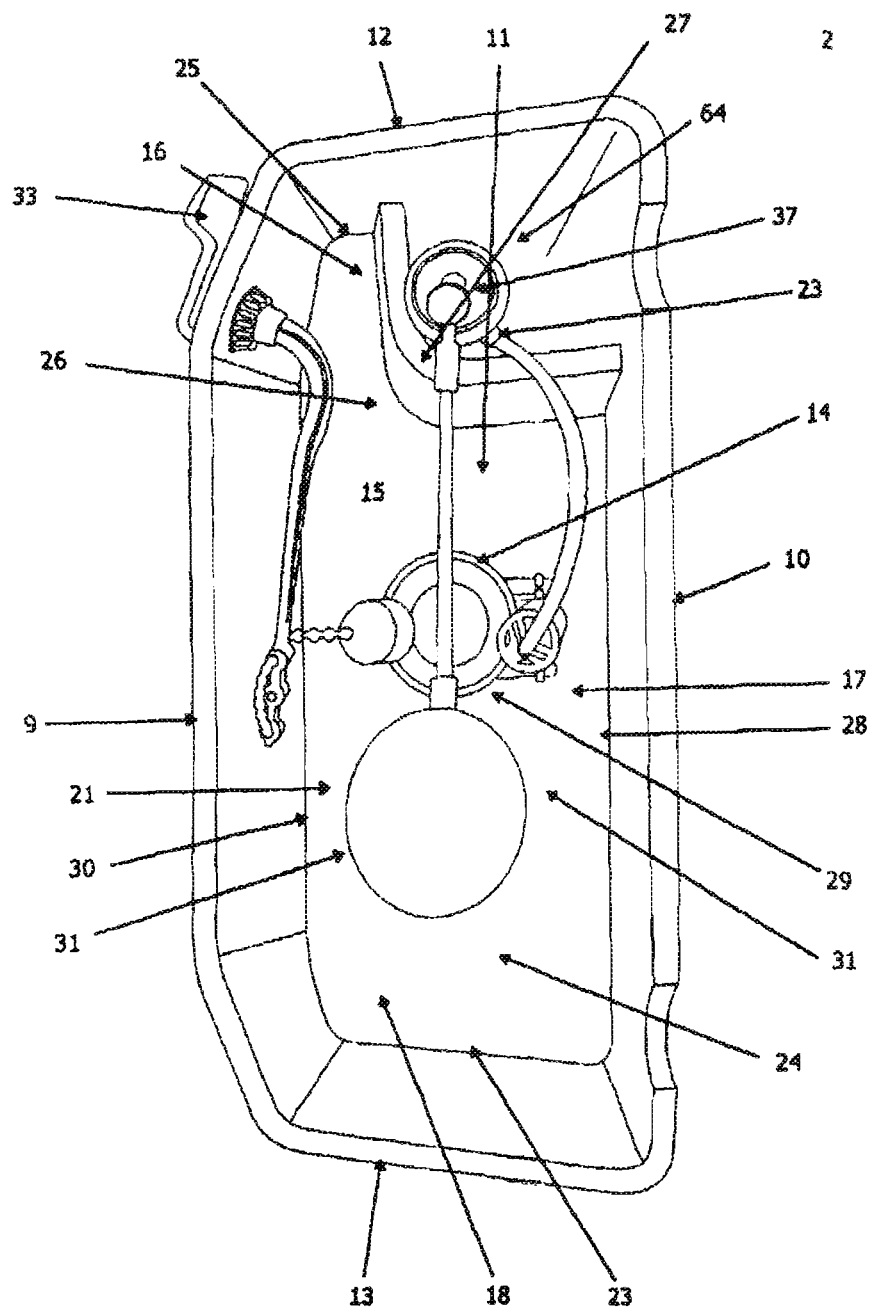
FIG. 5 is an upper plan view that shows the anti-sedimentation member placed in a prior-art toilet tank in order to convert it into an anti-sedimentation tank.
Figure 5A:
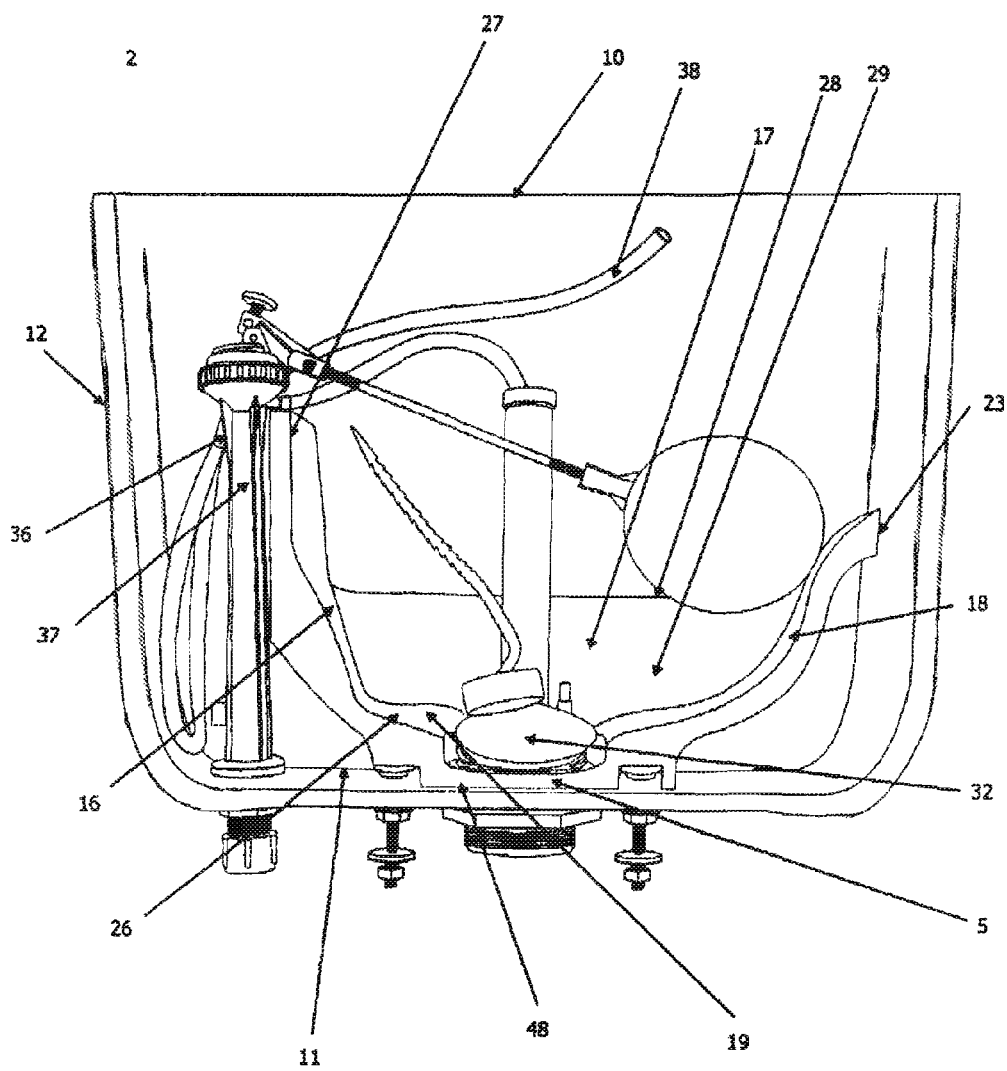
FIG. 5A is a front view of the anti-sedimentation tank shown in FIG. 5.
Figure 6:
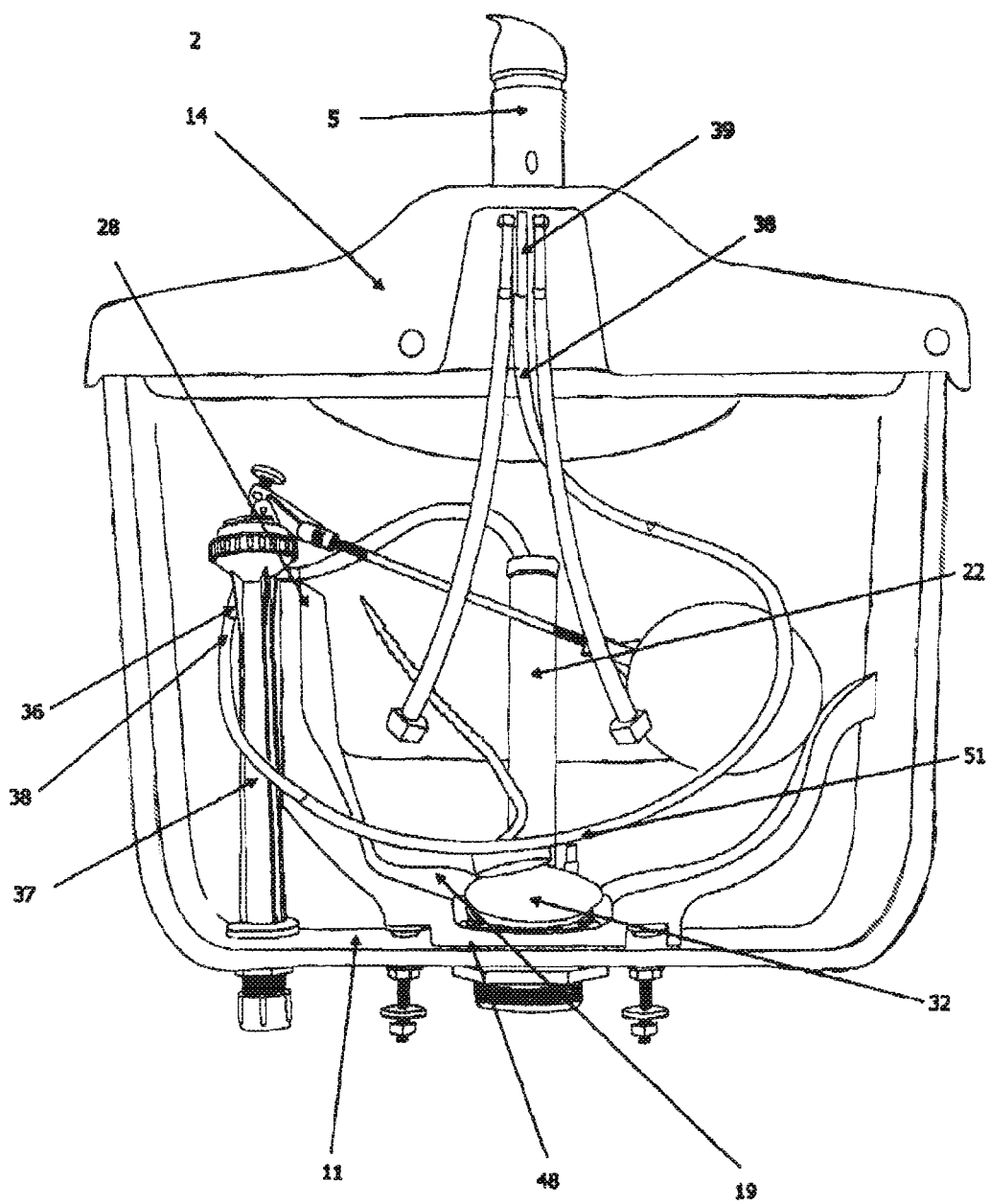
FIG. 6 is a rear cross-sectional view of the anti-sedimentation tank shown in FIG. 5 that illustrates the washbasin-shaped lid.
Figure 11:
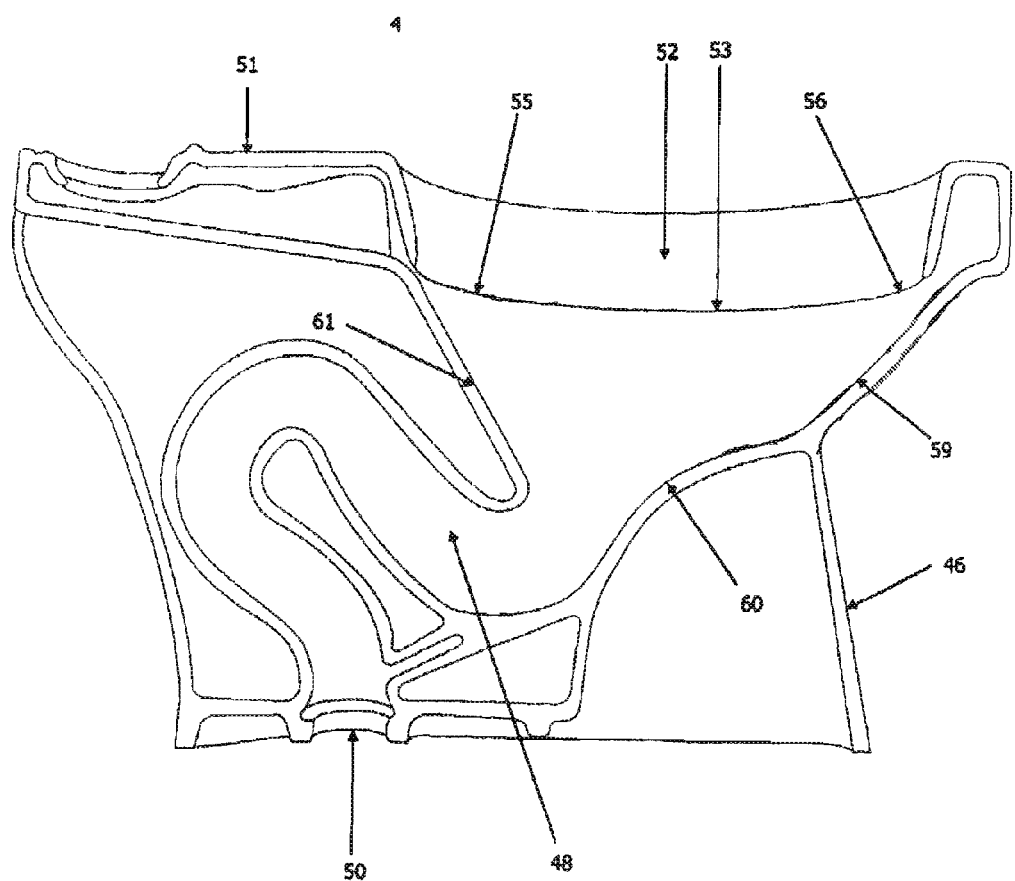
FIG. 11 is a longitudinal sectional view of the toilet bowl of the system for the management and disposal of liquid, solid and/or semi-solid wastes.

In a particularly preferred embodiment of the present invention, as illustrated in FIGS. 5, 5A and 6, which should be considered illustrative but not limiting of the present invention, right side wall 18 of anti-sedimentation member 15 has a joining portion 23 which is in contact with right side wall 13 and tank 8, and an entrainment portion 24 for increasing the entrainment force of the water to entrain any solid and/or semi-sold material that is in contact with its surface or near it and prevent the adhesion of formation of sediments on its surface. Joining portion 23 of right side wall 18 of the anti-sedimentation member is arranged adjacent to and projecting from the middle part of right side wall 13 of tank 8 toward concave bottom 19 of anti-sedimentation member 15 with an angle of inclination that is 47° in the place that is in contact with right side wall 13 of tank 8, and then increases the angle of inclination in entrainment portion 24, thus increasing the entrainment force of the water and preventing the formation of sediments. Entrainment portion 24 extends downward from joining portion 23 toward slightly concave bottom 19 at an angle of inclination of approximately 52°. The angle of inclination of entrainment portion 24 decreases gradually until it reaches an angle of inclination of 33° in the area where slightly concave bottom 19 of anti-sedimentation member 15 begins.

Left side wall 16 of anti-sedimentation member 15 has a joining portion 25 that is adjacent to and in contact with left side wall 12 of tank 8, an entrainment portion 26 to increase the entrainment force of the water which entrains any solid and/or semi-solid material that is in contact with its surface, and a vertical portion 27, usually in the form of a set square. Joining portion 25 of side wall 16 of anti-sedimentation member 15 is arranged adjacent to and projecting from the middle part of left side wall 16 of tank 8 toward concave bottom 19 of anti-sedimentation member 15 with an angle of inclination that is 48.5° in the location that is contact with left side wall 16 of tank 36.

The vertical portion 27, usually in the form of a set square takes up approximately 80% of the width of left side wall 16 and extends longitudinally near the area where slightly concave bottom 19 of anti-sedimentation member 15 begins. Preferably, vertical portion 27, side wall 12 and rear wall 10 of tank 8 define a cavity to allow the intake valve to be mounted and removed easily. Vertical portion 27 of side wall 16 has a height that is adequate for preventing the water stored in tank 8 from overflowing anti-sedimentation member 15. In a preferred embodiment, the height of vertical portion 27, usually in the form of a set square, is at least 1.25 cm (½") taller than the weir of discharge valve 22. The vertical portion 27, generally in the shape of a set square, has an angle of inclination of 9° in its upper part and then increases gradually to 12° in an intermediate area immediately contiguous to the area where slightly concave bottom 19 of anti-sedimentation member 15 begins.

Entrainment portion 26 of left side wall 16 of the anti-sedimentation member extends downward from joining portion 25 toward slightly concave bottom 19 to an angle of inclination of approximately 12°. The angle of inclination of entrainment portion 26 increases gradually, thus increasing the entrainment force of the water and preventing the formation of sediments, until a 33° angle of inclination is reached in the area where slightly concave bottom 19 of anti-sedimentation member 15 begins.

Figure 4A:
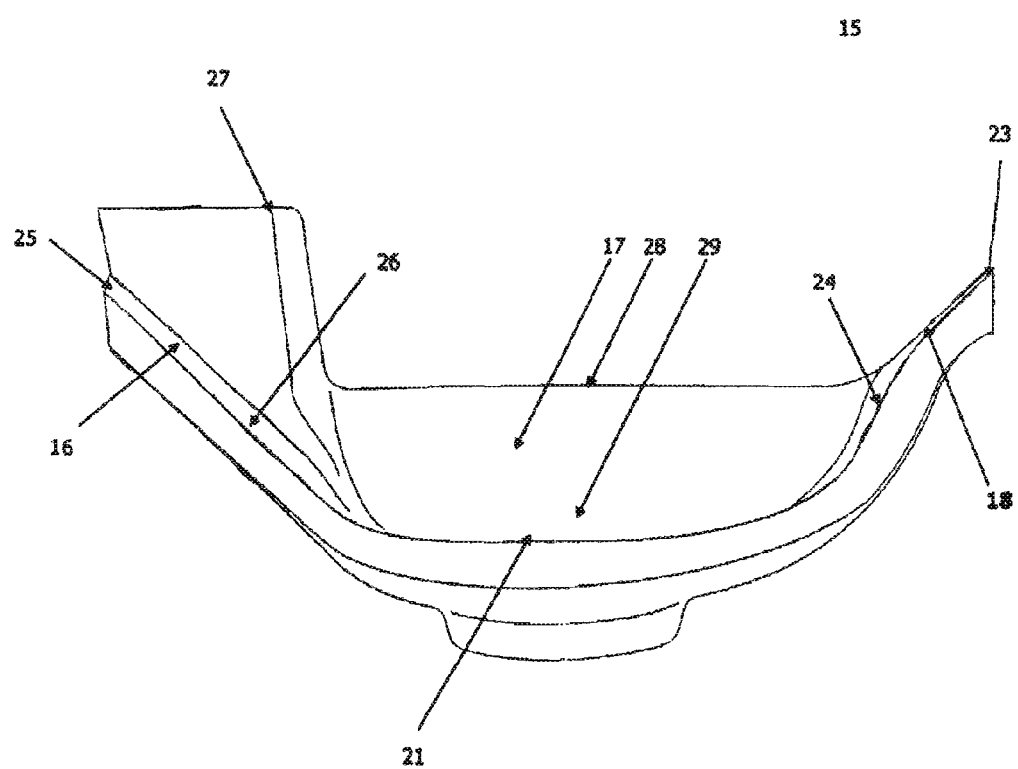
FIG. 4A is a front view of the anti-sedimentation member of FIG. 4.

Particularly in reference to FIG. 4A, an anti-sedimentation member 15 of the anti-sedimentation tank of the present invention is shown that also includes a rear wall 17 that has a joining portion 28 and an entrainment portion 29. Joining portion 28 is arranged adjacent to and projecting from the lower third of posterior wall 17 of tank 8 toward entrainment portion 29 of said rear wall 17. Entrainment portion 29 extends downward from joining portion 28. The angle of inclination of the joining and entrainment portions is practically 90° and then decreases gradually until it reaches a 33° angle of inclination in the area where slightly concave bottom 19 of anti-sedimentation member 15 begins where discharge valve 22 is mounted.

Likewise, front wall 21 (shown in FIG. 4) of anti-sedimentation element 15 includes a joining portion 30 and an entrainment portion 31. Joining portion 30 is arranged adjacent to and projecting from a height of approximately five centimeters from front wall 9 of tank 8 toward entrainment portion 31 of said front wall 21. Entrainment portion 31 extends downward from joining portion 30. The angle of inclination of the joining and entrainment portions is practically 90° and then decreases gradually until it reaches a 33° angle of inclination in the area where slightly concave bottom 19 of anti-sedimentation member 15 begins, where discharge valve 22 is mounted.

Slightly concave bottom 19 of anti-sedimentation tank 15 projects toward orifice 20 with an angle of inclination that goes from 33° in the area where side walls 16 and 18 of anti-sedimentation member 15 are contiguous with walls 12 and 13 of tank 8, decreasing gradually to 4° near orifice 20 where the discharge valve is mounted.

The angles of inclination and relative dimensions mentioned have been carefully determined and tested in the laboratory, resulting in the ideal angles and dimensions for the semi-solid and/or solid wastes that reach tank 8 to move to bottom 19 of anti-sedimentation element 15, which turns out to be the periphery of flapper 32 that seals the outlet of the discharge valve.

This configuration of anti-sedimentation member 15 is particularly useful for creating a decanting effect originated by the angles of inclination described above, which project from the tank walls to bottom 19 of the tank and flow together toward orifice 20 in which discharge valve 22 is mounted, with the result that the both the inorganic and organic semi-solid and/or solid wastes are led toward and discharged from the component of discharge valve 22, placed in the bottom 19 of anti-sedimentation tank 15, toward the inside of the toilet bowl. In addition, said configuration of anti-sedimentation member 15 causes a reduction of the volume of water required to fill the tank without affecting operation, since the toilet's discharge efficiency depends on the height of the level of the water stored in the tank rather than on its volume.

The internal surface of anti-sedimentation tank 2 has low porosity and low adherence properties to prevent both inorganic and organic semi-solid and/or solid wastes from adhering or being encrusted on its surface. In one embodiment, anti-sedimentation tank 2 can be manufactured in a single (that is, unitary) piece of ceramic, with a "double bottom" that generates conicity in the bottom. In another embodiment, anti-sedimentation member 15 can be manufactured as an insert to be assembled in a conventional tank 8 of the prior art. In the preferred embodiment (that is, unitary, as a single piece of ceramic), the same enamel that is applied to the exterior is applied to the interior of anti-sedimentation tank 2, which makes it sanitary, with very low porosity and adherence, to prevent solid and/or semi-solid wastes from being encrusted or deposited on the interior walls or on bottom 19, in addition to increasing the sliding properties in order to increase the entrainment force of the water that entrains the solid and/or semi-solid wastes.

In another embodiment of the present invention, anti-sedimentation member 15 can be manufactured from a material selected from the group consisting of polished resin, polycarbonates, low-porosity and low-adherence plastics, among others, and resistant to deformation from heat and impact, with anti-fungal properties to prevent both the inorganic and organic semi-solid and/or solid wastes from adhering to or being encrusted on its surface. For both embodiments, an additional anti-adherent coating agent can be applied optionally to increase the anti-adherent properties of the materials described above, such as, for example, PTFE or the like. In the embodiment where anti-sedimentation member 15 is manufactured as a separate element that will be assembled in a conventional toilet tank 8, the upper contour, adjacent to and in contact with the joining portions with walls 9, 10, 12 and 13 of tank 8, as well as orifice 20 where discharge valve 22 is mounted, are sealed with a suitable waterproof adhesive (for example, silicone), thus ensuring that the water contained in tank 8 of the prior art, converted into an anti-sedimentation tank 2, will not pass to its double bottom.

The low adherence of the internal walls of anti-sedimentation toilet tank 2 (which is the result of the vitreous enamel applied to the interior of the tank or of the material with which other embodiments are manufactured and/or the application of other anti-adherent materials such as PTFE or the like), plus the decantation effect originated by the angle of inclination of the joining and entrainment portions of walls 16, 17, 18 and 21 of anti-sedimentation member 15, plus slightly concave bottom 19 which flows into orifice 20 in which discharge valve 22 is mounted cause both the inorganic and organic semi-solid and/or solid wastes (food residues, soapy water, small pieces of soap, toothpaste residues, shaving residues, hair, etc.) to be temporarily deposited on bottom 19 of anti-sedimentation member 15 until actuating lever 33 is activated to send them to the interior of the toilet bowl by the entrainment force of the water.

Washbasin-Shaped Lid

FIGS. 1, 1A, 1B and 1C show the different configurations of anti-sedimentation tank 2 of the present invention and a washbasin-shaped tank lid 3 for obtaining a water-saving system that will take advantage of the water used in washbasin 3 to refill anti-sedimentation tank 2 and then remove the water contained in toilet bowl 4 and the feces contained therein. As illustrated, washbasin-shaped lid 3 has suitable shape and size to operate as a washbasin and, in a preferred embodiment shown in FIG. 1, closes the upper part of anti-sedimentation tank 2. In another embodiment, shown in FIG. 1A, washbasin-shaped lid 3 can be placed in a remote position in relation to tank 8 of the prior art. This embodiment also requires a channel 34 that leads a PVC tube 44 for transporting water from the outlet of washbasin drain 35 toward anti-sedimentation tank 2 of the present invention. A mixer valve 5, modified according to the present invention, is illustrated in FIGS. 1, 1A, 1B and 6, installed on washbasin-shaped lid 3, connected only to water outlet 36 of intake valve 37, through flexible hose 38, which in turn is connected to a third supply inlet 39.

Modified Mixer Valve

An example of a conventional single-control type mixer valve 40 from the prior art is illustrated in FIGS. 7 and 8, which consists of a cold water inlet orifice 41 and a hot water inlet orifice 42, located on the base of valve 43, which connect to the hot and cold water supply of the bathroom (not illustrated). Mixer valve 40 includes a water outlet conduit (not shown) where inlet orifices 41 and 42 join to allow the water to flow through the valve to the washbasin in which said valve is mounted. FIGS. 9 and 10 illustrate mixer valve 5 that incorporates the principles of the present invention to be used in washbasin 3 of a water-saving system, without having to activate the toilet discharge. As can be seen especially in FIG. 10, modified mixer valve 5 includes a third water supply intake 39 in base 43, communicating with the water outlet conduit where the flows from first and second cold and hot water inlets 41 and 42 converge, in which third supply intake 39 is connected to outlet 36 of intake valve 37 of anti-sedimentation tank 2, by means of a flexible hose 38, so that the water can be supplied to anti-sedimentation tank 2 when activating lever 33, which will send the water to anti-sedimentation tank 2 though mixer 5 without having to open the flow of said mixer. It should be understood that any type of mixer valve can be used that can be modified to incorporate a third water supply intake inlet 39 (by way of non-limiting illustration, single-control mixers, mixers with separate controls at 4", mixers with separate controls at 8", among others) and installed in water-saving systems of any of the three embodiments shown in FIGS. 1, 1A and 1B.

Under normal conditions, this mixer valve 5 (as shown in FIG. 3) would allow the water that would be poured directly into bottom 11 of tank 8 or bottom 19 of anti-sedimentation member 15, through original hose 45 of the intake valve (which in the present invention is substituted by a flexible hose 38), to be diverted to mixer valve 5. While mixer valve 5 is closed, the flow of water will be contained; when mixer valve 5 is opened (without having to discharge the toilet tank), the water will be poured on washbasin 3, going through anti-sedimentation tank 2, where it will be temporarily stored to be reused later in cleaning the toilet bowl. Now when actuating lever 33 is triggered, intake valve 37 opens the flow of water, sending the water through water outlet 36 and by flexible hose 38 at the third supply intake 39 and finally to mixer valve 5 to pour over washbasin 3 and reload anti-sedimentation tank 2, allowing hand-washing and similar uses, without having to trigger actuating lever 33. This functionality also applies to any of the three embodiments indicated in FIGS. 1, 1A and 1B (when the washbasin is the tank lid and is placed above the tank itself, when the washbasin is a tank lid and is placed separately from the tank, and/or when a conventional washbasin is connected to the toilet tank).

Open-Rim Toilet Bowl

As shown in FIGS. 1, 1A, 1B and 11, toilet bowl 4 generally comprises a pedestal 46, a bowl 47 placed on pedestal 46, a trap 48 that connects the toilet bowl to drain outlet 50, a rim 49 in the entire periphery of the upper part of the toilet bowl, and a bracket 51 for connecting to tank 2.

The toilet bowl according to the present invention is an open-rim toilet bowl. The term "open-rim" means an annular conduit runs around the entire upper perimeter of the toilet bowl, through which the water stored in the tank is poured into the bowl to clean it. According to the aspects of the present invention, the rim has an opening throughout its entire trajectory instead of a plurality of circular openings. Examples of open-rim toilet bowls are disclosed in Gavin's U.S. Pat. No. 1,289,151 entitled "Process for manufacturing toilet bowls"; Lawrence and Crane's U.S. Pat. No. 1,337,663 entitled "Method for making sanitary pottery"; Bowers' U.S. Pat. No. 1,447,529 entitled "Sanitary molds and molding process"; Kosugi et al.'s U.S. Pat. No. 5,514,316 entitled "Drip molding method for manufacturing ceramic items"; and Bergquist and Williams' U.S. Pat. No. 6,428,643, entitled "Method and device for molding plumbing accessories." The inventions disclosed in said patents relate to the manufacture of open-rim toilet bowls in order to make the manufacture of toilet bowls and other ceramic products simpler, more rapid and/or more economical. The open-rim toilet bowl that is a component of the present invention, on the other hand, has been specifically designed and developed to prevent the obstruction of the rim of said toilet bowl by the solid and/or semi-solid wastes contained in the water stored in the anti-sedimentation tank described above, which is another component of the water-saving system that is the subject of the present invention.

Figure 12:
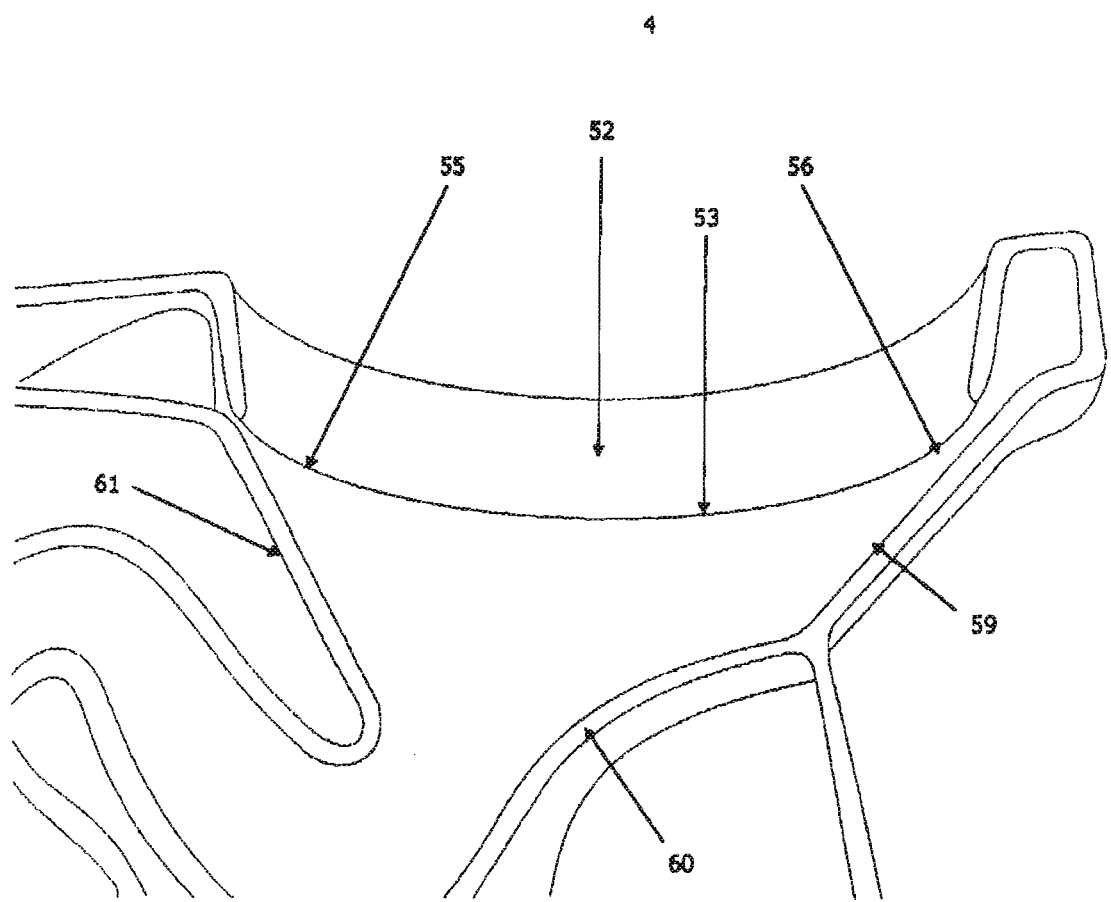
FIG. 12 is an enlarged longitudinal sectional view of the toilet bowl of the system for the management and disposal of liquid, solid and/or semi-solid wastes that shows the open rim in detail.
Figure 13:
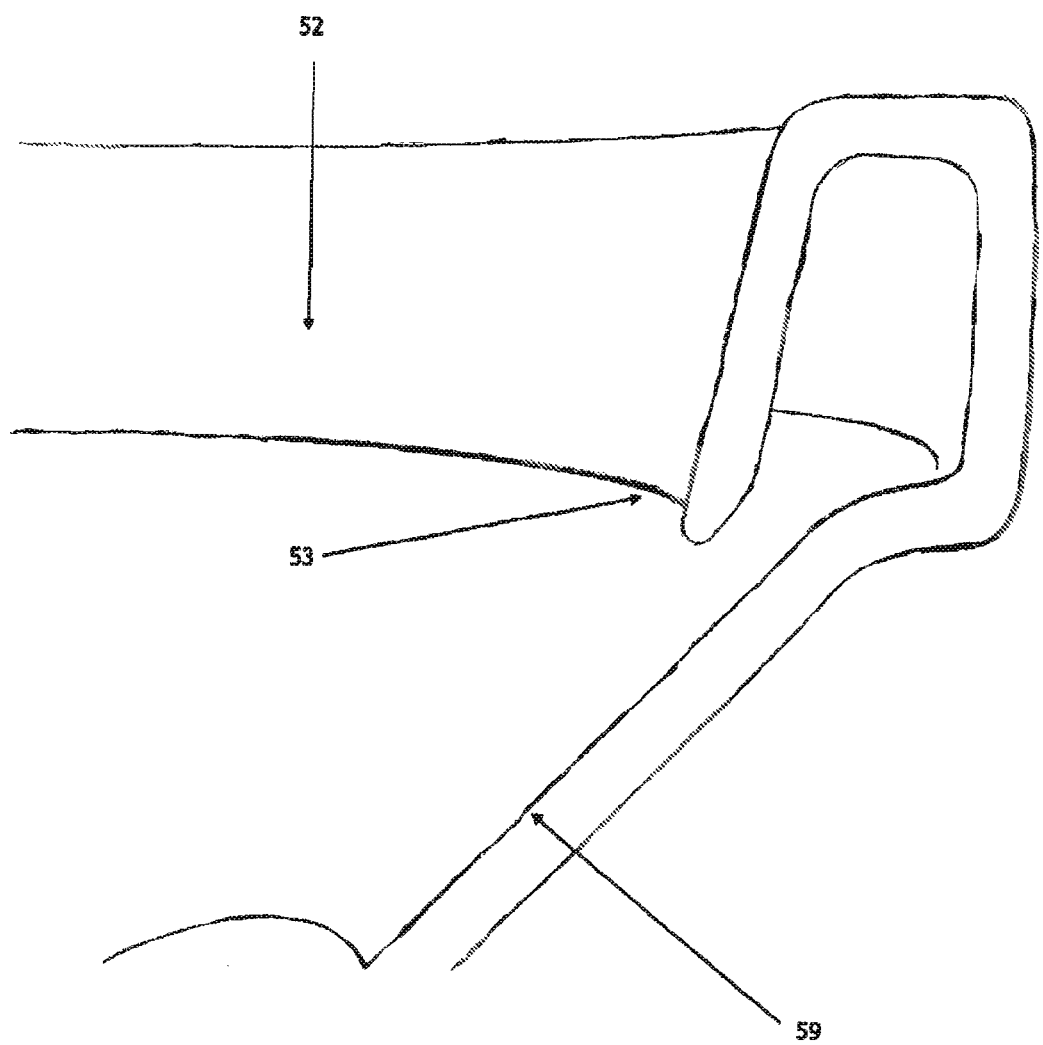
FIG. 13 is an enlarged view that shows a detail of the open rim of the toilet bowl of the system for the management and disposal of liquid, solid and/or semi-solid wastes.
Figure 14:
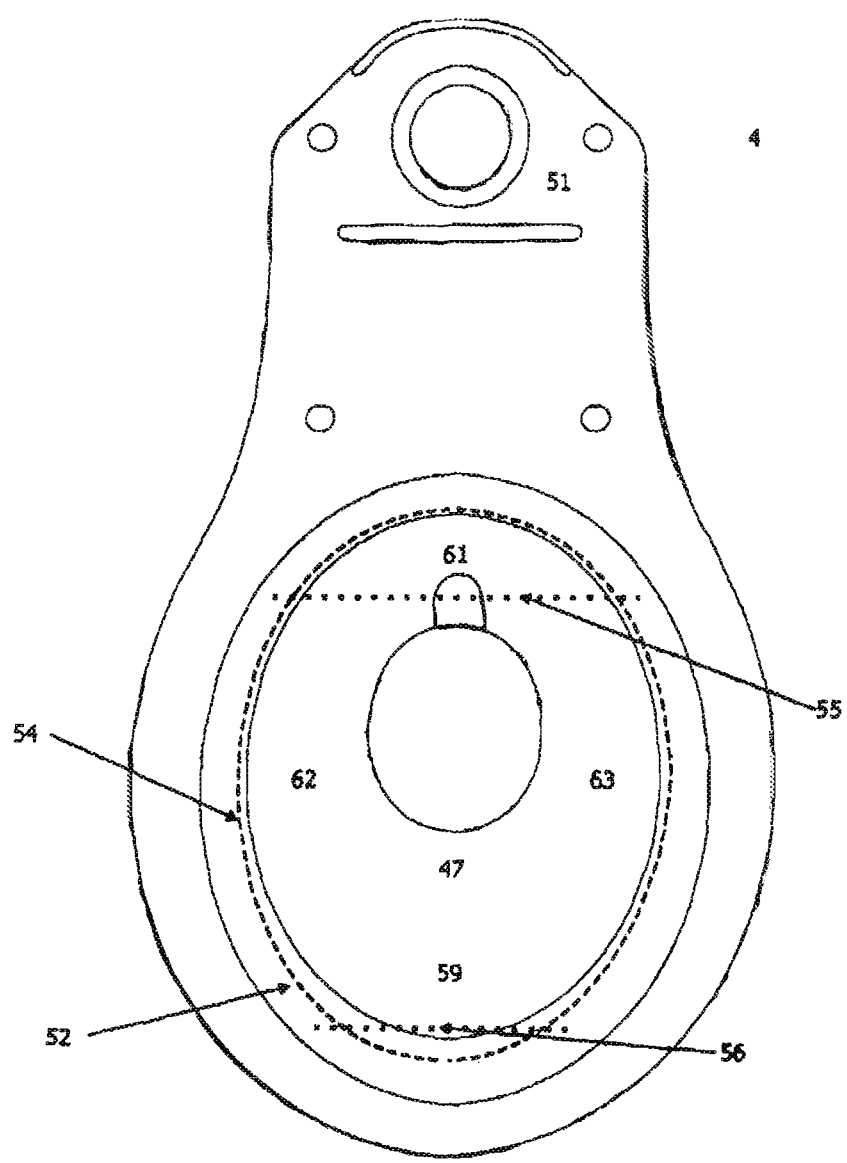
FIG. 14 is a plan view of the toilet bowl of the system for the management and disposal of liquid, solid and/or semi-solid wastes.
Figure 15:
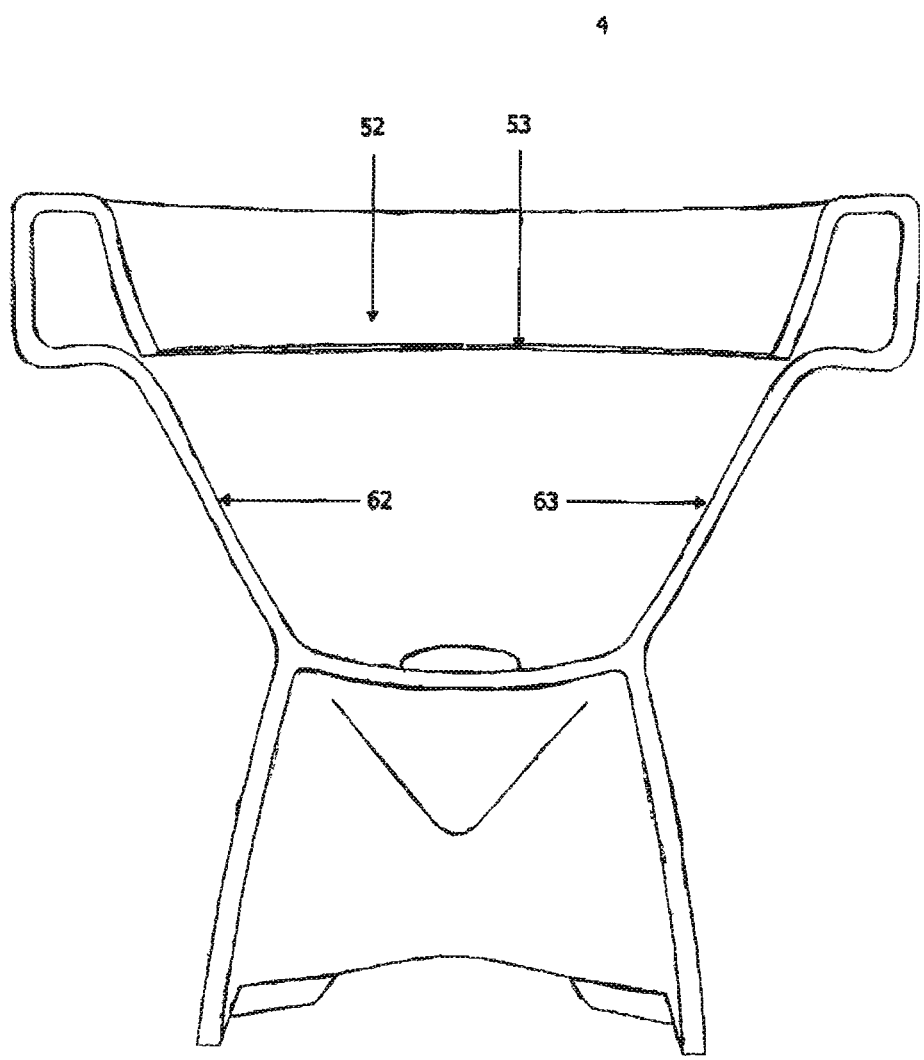
FIG. 15 is a front cross-sectional view of the toilet bowl of the system for the management and disposal of liquid, solid and/or semi-solid wastes.

Toilet bowl 4 of the system for the management and disposal of liquid, solid and semi-solid wastes consists of a rim 49 that is radially open throughout its entire length and has three sections with a different opening in each section, where each opening is defined by the distance between skirt 52 and vortex 53 (see FIGS. 12 and 13), shown in FIG. 14 by phantom line 54.

FIG. 14 illustrates opening 54 of rim 49 of the toilet bowl of the system for the management and disposal of liquid, solid and semi-solid wastes that consists of three sections, to wit: a rear section, which is defined between the two points where imaginary line 55 crosses phantom line 54, having a 10-mm opening as measured between skirt 52 and vortex 53, this opening being suitable for a portion of the water from anti-sedimentation tank 2 to wash rear portion 61 of bowl 47 and contribute to generating a vortex in bowl 47, two side sections, left and right, which are defined as the distances between the points in which phantom line 54 crosses imaginary lines 55 and 56 in the left and right portions of the rim, respectively, having an 11-mm opening as measured between skirt 52 and vortex 53, this opening being suitable for a portion of the water from anti-sedimentation tank 2 to wash the left and right portions of bowl 47; and a front section, which is defined as the distance between the two points in which imaginary line 56 crosses phantom line 54, having a maximum 14-mm opening as measured between skirt 52 and vortex 53, this opening being suitable for a portion of the water from anti-sedimentation tank 2 to wash the front portion of bowl 47 and contribute to generating a powerful vortex in bowl 47.

Since the rim of the toilet bowl of the system for managing and disposing of wastes that is the subject of the present invention is open throughout its extension (unlike the more commonly used toilet bowls, whose rim only has small orifices through which the water passes), this system for the management and disposal of liquid, semi-solid and/or solid wastes will allow a suitable and efficient management and disposal of the semi-solid and/or solid wastes from washbasin 3 to the outlet of drain 50, having passed through and been temporarily stored in anti-sedimentation tank 2, without causing any kind of obstruction.

The openings of rim 54 differ between the rear, side and front segments, in order to increase the entrainment force with which the water reaches the front part of said rim, in order to entrain to said front part of said rim any solid object up to ½" in size, allowing its adequate removable and preventing obstructions in the rim.

The amount of water that is poured through the rear and side segments of the rim thanks to this configuration suffices for washing the walls of the toilet bowl, but since the greatest amount of water is poured through the front segment of the rim, the entrainment force increases, making the water entrain the solid and/or semi-solid wastes with it to said front segment (which is the portion having the greatest rim opening), so that these wastes will not cause obstructions but will be poured to the toilet bowl by the front, together with the water than cleans the toilet bowl and feces found in it.

Bowl 47 of toilet bowl 4 of the system for managing liquid, solid and semi-solid wastes has, in its front wall 59 (see FIG. 12) a slope inclined 44° toward the front in relation to the vertical to a point where it presents a convex portion 60 that is useful for increasing the incoming pressure of water to trap 48. Bowl 47 has a rear wall 61, a slope inclined 27° back in relation to the vertical; in left side wall 62 and in right side wall 63 (see FIG. 16), the bowl has a 36° slope to the left and to the right, respectively, in relation to the vertical. Walls 59, 61, 62 and 63 described above define a cone. Due to this configuration, toilet bowl 4 of the system for the management and disposal of liquid, solid and semi-solid wastes allows the water poured from the rim to the bowl to acquire greater entrainment force, since it encounters very little hydrodynamic resistance, which results in superior efficiency and, together with the sections of the rim with different openings, complete cleaning is achieved with a discharge of only 4 L.

Trap 48 of toilet bowl 4 of the system for the management and disposal of liquid, solid and semi-solid wastes (which is the conduit that connects the lowest portion of bowl 47 to the outlet of drain 50) has a uniform diameter throughout its trajectory, which is approximately 2" in diameter (unlike the traps in the toilet bowls of the prior art, whose diameter is variable and/or inconsistent). The uniformity of the diameter of trap 48 of toilet bowl 4 of the present invention increases the efficiency of the toilet bowl, since the decrease in the water's hydrodynamic force is minimal in its trajectory from bowl to drain.

Trap 48 of toilet bowl 4 pours the liquid, solid and semi-solid wastes vertically directly into the outlet of drain 50, to take advantage of all of the hydrodynamic force with minimum loss, unlike the toilet bowls of the prior art, which are characterized by having a flat surface adjacent to the drain outlet, which causes a loss of hydrodynamic force upon pouring into the drain.

A complete operating cycle of the new system for the management and disposal of liquid, solid and semi-solid wastes will be described below.

Figure 1C:
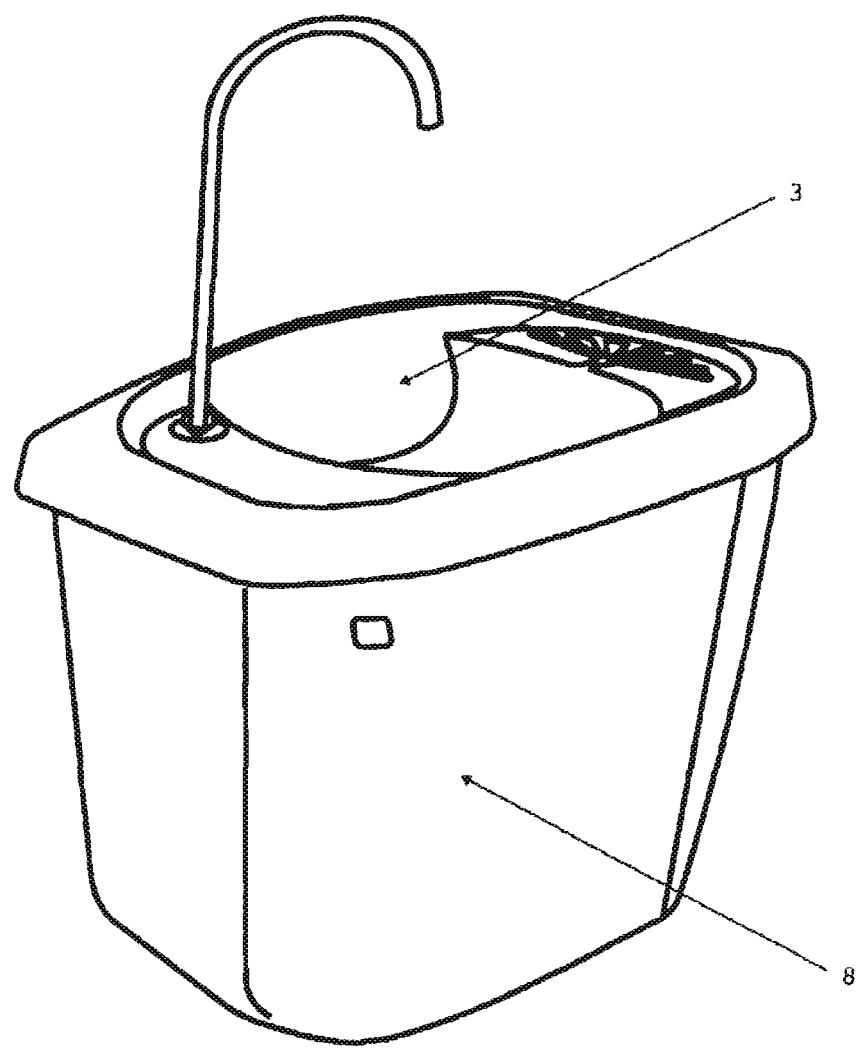
FIG. 1C is a perspective view of a prior-art tank used in the water-saving systems that shows the tank lid modified to function as a washbasin and a tube by which the toilet tank is replenished after the toilet is flushed.

In its resting state, the water-saving system for the management and disposal of liquid, solid and/or semi-solid wastes 1 of the present invention joins anti-sedimentation tank 2, containing water which has been used in washbasin-shaped tank lid 3, so that it contains organic and/or inorganic solid and/or semi-solid residues, such as food residues, fine sand, pieces of soap, soapy water, toothpaste residues, shaving residues, hair, etc. In order to illustrate that which has been described, FIGS. 1 to 1C show examples of tanks used in water-saving systems. Likewise, in its resting state, bowl 47 contains water and solid and/or semi-solid wastes that are not illustrated (human feces, toilet paper, etc.).

First we will describe the operation of anti-sedimentation tank 2 (including its interrelationship with washbasin 3 and modified mixer 5) and then we will describe the operation of toilet bowl 4 of the present invention, with the understanding that these components that make up the saving system for the management and disposal of liquid, semi-solid wastes of the present invention have been designed for optimum operation, such that they cannot operate separately, that is, said components combined with any of the components of the prior art will not operate according to the principles and objectives of the present invention.

Flushing the toilet by pushing down on actuator lever 33 opens intake valve 37, causing clean water to flow from said intake valve 37 through water outlet 36, then through flexible hose 38 and to third supply intake 39 of mixer valve 5, so that the user can wash his hands or mouth in washbasin 3 with the clean water from intake valve 37 which will then be stored in anti-sedimentation tank 2. In another embodiment, the user can use washbasin 3 without having used the toilet, to do so will only require opening mixer valve 5; the used water will pass through washbasin 3 to be temporarily stored in anti-sedimentation tank 2. Both embodiments imply that the water with which anti-sedimentation tank 2 is filled, after being used in washbasin 3, contains both inorganic and organic solid and/or semi-solid wastes.

Thus, by flushing the toilet by pushing actuating lever 33 down (in the same way as in a conventional tank), "frog" 32 of discharge valve 22 lifts, allowing the water to flow from anti-sedimentation tank 2 to toilet bowl 4, emptying the water that will serve to empty the toilet bowl and the feces it contains, as well as the semi-solid and/or solid wastes temporarily stored in the bottom 19 of anti-sedimentation tank 2.

Anti-sedimentation tank 2 allows the suitable management and disposal of the semi-solid and/or solid wastes received from any source, so that they do not thicken or become encrusted in bottom 19, which makes it the first toilet tank suitable to be used in water-saving systems that combine a washbasin and a toilet in order to reuse the water temporarily stored in the tank (after being used in a washbasin or some other device) for cleaning the toilet bowl and flushing the wastes contained therein (human feces).

Even if the water stored in anti-sedimentation tank 2 contains inorganic or organic residues (such as food residues, fine sand, pieces of soap, soapy water, toothpaste residues, shaving residues, hair, etc.), these residues will be managed and removed, preventing the formation of sedimentations and/or encrustations that can cause anything from bad odors to foci of contamination or infection.

Due to the characteristics of the toilet anti-sedimentation tank, both inorganic and organic semi-solid and/or solid wastes (food residues, soapy water, small pieces of soap, toothpaste residues, beard residue, hair, etc.) that reach its interior (from any source, whether the water line, a washbasin or another device) will be appropriately managed and removed, without thickening or being encrusted inside of anti-sedimentation tank 2.

In addition, in a preferred embodiment, the interior of anti-sedimentation tank 2 that is the object of the present invention receives the same vitreous enamel that is used for the exterior finish of the bathroom fixtures, which not only confers the same sanitary characteristics on them but, since it has much less adherence than non-vitrified ceramic, prevents semi-solid and/or solid residues from becoming encrusted inside the anti-sedimentation tank. Other embodiments of the anti-sedimentation tank consist of a type of "insert" manufactured from one or another of various materials providing it with low adherence and porosity.

In order to prevent any water leaks in the head of intake valve 37 from flooding cavity 64 formed by the space defined between set square 27 of anti-sedimentation member 15 and bottom 11 of the tank and left side wall 12 and rear wall 10 of tank 8, a water trap is installed (not illustrated) in the upper part of the body of said intake valve 37, precisely adjacent to it and tightened and/or sealed with some adhesive (for example, silicone) at its head. Said water trap is capable of capturing the water from said probable leaks, channeling it to bottom 19 of anti-sedimentation tank 2. This trap may be made of various high-resilience plastic, thermoplastic and/or similar materials and may be made in any shape appropriate for carrying out its collection and channeling objective.

Likewise, anti-sedimentation tank 32 will optionally include packing to reduce or eliminate the possibility of the semi-solid and/or solid wastes temporarily stored in bottom 19 of anti-sedimentation tank 2 to be deposited in the gap between the discharge valve and "frog" 32. Said packing will be waterproof rubber packing (not illustrated) filling said gap.

Now we will describe the toilet bowl operation part of the system for the management and disposal of liquid, solid and semi-solid wastes of the present invention, with the understanding that said system consists of said toilet bowl and the anti-sedimentation tank and toilet bowl described above.

When actuating lever 33 is operated by pushing it down, water passes from anti-sedimentation tank 2 to toilet bowl 4 through the opening in rim 54. A small portion of water goes out the rear section and the side sections of open rim 54 to wash walls 61, 62 and 63 of the bowl; however, most of the water flows toward the front wall of rim 59, entrainment the solid and/or semi-solid wastes with it and hurling them toward the bowl, without causing obstructions in rim opening 54. The water generates a superior entrainment force, thanks to the degrees of inclination of walls 59, 61, 62 and 63 of the bowl, which offer minimum hydrodynamic resistance. The water level in the bowl increases, causing a pressure differential within trap 48, which in turn generates a siphoning effect, pulling the water contained in bowl 47 through trap 48, hurling said water in a directly vertical manner at drain outlet 50. Thanks to the open configuration of rim 54 and mainly due to the different openings of said rim in the four sections defined above, the solid and/or semi-solid wastes temporarily stored in anti-sedimentation tank 2 flow from said anti-sedimentation tank 2 to drain outlet 50 without obstructing the opening in rim 54 or trap 48. Since the diameter of trap 48 is uniform along its entire trajectory and trap 48 pours the liquid, solid and semi-solid wastes vertically over drain outlet 50, all of the water from anti-sedimentation tank 2 (together with the solid and/or semi-solid wastes it may contain), as well as the water contained in the bowl (including the solid and/or semi-solid wastes that it may contain, human feces, toilet tissue, etc.), is efficiently hurled to the drain with a single 4-L discharge.

The openings in the four sections of rim 54 (rear, side and front); walls 59, 61, 62 and 63 that give the bowl its conical shape; the uniformity of the diameter of the trap and the verticality with which the water is poured to drain outlet 50 have been carefully determined by trial-and-error tests, resulting in the ideal parameters for the liquid, semi-solid and solid wastes to be moved from anti-sedimentation tank 2, through rim 54, passing to bowl 47, to trap 48, to drain outlet 50, with no obstructions and with a single 4-L discharge.

It should be pointed out that, if anti-sedimentation tank 2, which includes a washbasin-shaped tank lid 3 and a modified mixer valve 5 of the present invention, is combined with a closed-rim toilet bowl of the prior art, the orifices of the rim of said toilet bowl would be obstructed with the semi-solid and/or solid wastes temporarily stored in said anti-sedimentation tank 2, making the toilet unusable, besides not achieving the decrease in water consumption to only 4 L per discharge. If the anti-sedimentation tank 2 of the present invention (including a washbasin-shaped tank lid 3 and a modified mixer valve 5) is combined with an open-rim toilet bowl from the prior art, the open rim would probably not get obstructed, but the decrease in water consumption to only 4 L per discharge would not be obtained. If a tank from the prior art 8 is combined with a washbasin-shaped tank lid 3 and a modified valve 5 of the present invention with a closed rim toilet bowl of the prior art, the solid and/or semi-solid wastes stored in said tank 8 would be deposited and/or encrusted inside of said tank 8, causing bad odors and/or foci of infection.

Although particular embodiments of the present invention have been illustrated and described, it will be obvious to those skilled in the art that various other changes and modifications can be made without departing from the essence and the scope of the invention. Therefore, the attached claims seek to protect any changes and modifications that are within the scope of the present invention.

The invention claimed is:

1. A water-saving system for the management and disposal of liquid, semi-solid and solid wastes, the system comprising:
   an open-rim toilet bowl having an open rim, which allows greywater that contains food residues, small pieces of soap, soapy water, toothpaste residues, shaving residues, or hair, to flow without allowing the formation of obstructions throughout an entire length of the open rim;
   an anti-sedimentation tank placed above and connected to the toilet bowl, said anti-sedimentation tank being capable of receiving and storing greywater, which will be reused when the toilet is flushed to clean the toilet bowl and flush the wastes contained therein, the anti-sedimentation tank having an upper part, a water outlet, and an anti-sedimentation member therein, the anti-sedimentation member having an orifice centrally located therein, the orifice being positioned above and adjacent the water outlet;
   a washbasin-shaped tank lid operative to be placed above and to close the upper part of the anti-sedimentation tank; and
   a mixer valve installed in the washbasin-shaped lid and connected to cold and hot water supplies, where the mixer valve includes a third water supply intake which is also connected to the water outlet of the anti-sedimentation tank's intake valve by means of a flexible hose.

2. The water-saving system according to claim 1, further comprising:
   a conventional lid for closing the anti-sedimentation tank, where the washbasin-shaped lid is installed in a remote position in relation to the anti-sedimentation tank.

3. The water-saving system according to claim 2, further comprising:
   a channel for housing a conductor pipe for transporting greywater from the washbasin-shaped lid to the anti-sedimentation tank, as well as guiding the flexible hose from the water outlet of the intake valve to the third water supply intake of the mixer valve of the anti-sedimentation tank.

4. The water-saving system according to claim 1, further comprising:
   a conventional lid operative to close the anti-sedimentation tank; and
   a conventional washbasin placed in a remote position in relation to the anti-sedimentation tank.

5. The water-saving system according to claim 4, further comprising:
- a channel for housing a conductor pipe for transporting greywater from the conventional washbasin to the anti-sedimentation tank, as well as guiding the flexible hose from the third water supply intake of the mixer valve to the water outlet of the intake valve of the anti-sedimentation tank.

6. The water-saving system according to claim 1, wherein the anti-sedimentation member further comprises a concave bottom, with the orifice being at a lowest point of the concave bottom.

7. The water-saving system according to claim 1, wherein the open-rim toilet bowl further comprises:
- a rim open radially along its entire length that includes a skirt and a base, the rim including a rear section having a first opening, two side sections, one each to the left and right, the left side section having a second opening and the right side section having a third opening, and a front section having a fourth opening, wherein each of the first through fourth openings varies in dimension from the opening in an adjacent section, to prevent any formation of obstructions along said section, and where each opening is defined by a distance between the skirt and the base; and
- a trap,
- wherein a center of the first opening and a center of the fourth opening are diametrically opposed on opposite sides of the bowl from one another.

* * * * *